(12) United States Patent
Ko et al.

(10) Patent No.: US 8,358,611 B2
(45) Date of Patent: Jan. 22, 2013

(54) METHOD FOR TRANSMITTING MULTIPLE CODE WORDS IN A MULTIPLE ANTENNA SYSTEM

(75) Inventors: Hyun Soo Ko, Gyeongki-do (KR); Jae Hoon Chung, Gyeongki-do (KR); Seung Hee Han, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 13/058,494

(22) PCT Filed: Aug. 10, 2009

(86) PCT No.: PCT/KR2009/004446
§ 371 (c)(1),
(2), (4) Date: Feb. 10, 2011

(87) PCT Pub. No.: WO2010/018957
PCT Pub. Date: Feb. 18, 2010

(65) Prior Publication Data
US 2011/0142001 A1    Jun. 16, 2011

Related U.S. Application Data

(60) Provisional application No. 61/152,263, filed on Feb. 13, 2009, provisional application No. 61/153,961, filed on Feb. 19, 2009, provisional application No. 61/172,763, filed on Apr. 26, 2009, provisional application No. 61/101,996, filed on Oct. 1, 2008, provisional application No. 61/152,252, filed on Feb. 12, 2009, provisional application No. 61/087,976, filed on Aug. 11, 2008, provisional application No. 61/152,560, filed on Feb. 13, 2009.

(51) Int. Cl.
*H04B 7/204*    (2006.01)
(52) U.S. Cl. ........................ 370/319; 370/349
(58) Field of Classification Search .................. 370/334, 370/319, 344, 203, 208, 349; 375/260, 267, 375/273, 272, 303, 308
See application file for complete search history.

(56) References Cited

U.S. PATENT DOCUMENTS
8,107,455 B2    1/2012    Ko et al.
(Continued)

FOREIGN PATENT DOCUMENTS
EP    1928115    6/2008
(Continued)

OTHER PUBLICATIONS

Korean Office Action dated Sep. 2, 2011.
(Continued)

*Primary Examiner* — Brenda H Pham
(74) *Attorney, Agent, or Firm* — Morgan, Lewis & Bockius LLP

(57) ABSTRACT

Provided is a method of sending multiple codewords in a wireless communication system using a plurality of transmitting antennas. The method includes the steps of encoding a plurality of parallel information bit streams to generate a plurality of parallel codewords; modulating the plurality of parallel codewords to generate a plurality of parallel modulated symbol streams; performing a DFT (Discrete Fourier Transform) on the modulated symbol streams to generate a plurality of frequency domain symbol streams; performing a pre-coding process on the plurality of frequency domain symbol streams; mapping the plurality of precoded frequency domain symbol streams to resource elements; performing an IFFT (Inverse Fast Fourier Transform) on the plurality of frequency domain symbol streams to generate SC-FDMA (Single Carrier Frequency Division Multiple Access) symbols; performing shifting, at a predetermined time interval, on layers at which the plurality of parallel codewords, the plurality of parallel modulated symbol streams, or the plurality of frequency domain symbol streams; and transmitting the SC-FDMA symbol.

11 Claims, 9 Drawing Sheets

U.S. PATENT DOCUMENTS

| | | |
|---|---|---|
| 8,194,778 B2 | 6/2012 | Ko et al. |
| 8,259,824 B2 * | 9/2012 | Varadarajan et al. ......... 375/260 |
| 2004/0132413 A1 | 7/2004 | Hwang et al. |
| 2007/0274411 A1 * | 11/2007 | Lee et al. ...................... 375/267 |
| 2007/0286304 A1 | 12/2007 | Kim et al. |
| 2008/0013610 A1 | 1/2008 | Varadarajan et al. |
| 2008/0186916 A1 | 8/2008 | Oshiba et al. |
| 2008/0260058 A1 | 10/2008 | Li |
| 2009/0323840 A1 | 12/2009 | Lee et al. |
| 2010/0208838 A1 | 8/2010 | Lee et al. |
| 2010/0220801 A1 | 9/2010 | Lee et al. |
| 2010/0284484 A1 | 11/2010 | Jongren et al. |
| 2011/0058621 A1 | 3/2011 | Clerckx et al. |
| 2011/0096851 A1 | 4/2011 | Clerckx et al. |
| 2012/0014242 A1 * | 1/2012 | Kim et al. ..................... 370/203 |

FOREIGN PATENT DOCUMENTS

| | | |
|---|---|---|
| KR | 10-2004-0062335 | 7/2004 |
| KR | 2008-0086333 | 9/2008 |
| WO | 2007/041086 | 4/2007 |
| WO | 2007/095102 | 8/2007 |

OTHER PUBLICATIONS

Myung, H. et al., "Peak Power Characteristics of Single Carrier FDMA MIMO Precoding System", IEEE 66th Vehicular Technology Conference, 2007, pp. 477-481.

Grieco, D. et al., "Uplink Single-User MIMO for 3GPP LTE", IEEE International Symposium on Personal, Indoor and Mobile Radio Communications, 2007, pp. 1-5.

International Search Report from PCT/KR2009/004483.
International Search Report from PCT/KR2009/004446.
International Search Report from PCT/KR2010/000957.
Notice of Allowance issued in related technology U.S. Appl. No. 13/201,214 dated Jul. 26, 2012.

* cited by examiner

METHOD FOR TRANSMITTING MULTIPLE CODE WORDS IN A MULTIPLE ANTENNA SYSTEM

The present application is a national stage of PCT International Application No. PCT/KR2009/004446 filed Aug. 10, 2009, and claims the benefit of US Provisional Application Nos. 61/087,976, (filed Aug. 11, 2008), 61/101,996, (filed Oct. 1, 2008), 61/152,252, (filed Feb. 12, 2009), 61/152,560, (filed Feb. 13, 2009), 61/152,263, (filed Feb. 13, 2009), 61/153,961, (filed Feb. 19, 2009), 61/172,763 (filed Apr. 26, 2009).

TECHNICAL FIELD

The present invention relates to wireless communication, and more particularly, to a method of sending multiple codewords in a multi-antenna system.

BACKGROUND ART

Recently, a demand for wireless data service is abruptly increasing. Evolution from wireless voice service to wireless data service requires a gradual increase in the wireless capacity. Such requirement makes wireless service providers and wireless equipment manufacturers try to improve the data transmission rate of wireless systems, giving them a motive to do active research.

Wireless channels experience several problems, such as path loss, shadowing, fading, noise, a limited bandwidth, a power limit of a terminal, and interference between users. Such limitations make the wireless channel have a form similar to a narrow pipe, hindering the fast flow of data, and also make it difficult to design an efficient bandwidth of wireless communication which provides high-speed data transmission. Other challenges in the design of a wireless system include resource allocation, mobility issues related to a rapidly changing physical channel, portability, and a design in which security and privacy are taken into consideration.

When a transmission channel experiences deep fading, if an additional version or replica of a transmitted signal is not received, it makes it difficult for a receiver to determine the transmitted signal. Resources, corresponding to the additional version or replica, are called diversity. Diversity is one of the most important factors contributing to reliable transmission through wireless channels. If such diversity is employed, the capacity or reliability of data transmission can be maximized. A system, implementing diversity using multiple transmission antennas and multiple reception antennas, is called as a Multiple Input Multiple Output (MIMO) system.

In an MIMO system, schemes for implementing diversity include Space Frequency Block Code (SFBC), Space Time Block Code (STBC), Cyclic Delay Diversity (CDD), Frequency Switched Transmit Diversity (FSTD), Time Switched Transmit Diversity (TSTD), Precoding Vector Switching (PVS), and Spatial Multiplexing (SM) schemes.

Meanwhile, one of systems taken into consideration, from among systems subsequent to the third generation systems, is an Orthogonal Frequency Division Multiplexing (OFDM) system which can attenuate an inter-symbol interference effect through a low complexity. In the OFDM system, serial input data is converted into an N number of parallel data, and the parallel data is carried on an N number of orthogonal subcarriers and then transmitted. The subcarriers maintain orthogonality in the frequency domain. An Orthogonal Frequency Division Multiple Access (OFDMA) scheme refers to a multi-access method of realizing multi-access by independently providing some of available subcarriers to each of users in a system using OFDM as a modulation scheme.

However, one of the major problems of the OFDM/OFDMA systems is that a Peak to Average Power Ratio (PAPR) may be very high. The PAPR problem means that the peak amplitude of a transmission signal is very greater than the mean amplitude. The PAPR problem results from the fact that an OFDM symbol is the overlapping of an N number of sinusoidal signals on different subcarriers. In particular, the PAPR is related to the capacity of the battery and is problematic in a terminal sensitive to power consumption. In order to reduce power consumption, it is necessary to lower the PAPR.

One of systems proposed to lower the PAPR is Single Carrier-Frequency Division Multiple Access (SC-FDMA). SC-FDMA is of a form in which the Frequency Division Multiple Access (FDMA) method is grafted onto the Single Carrier-Frequency Division Equalization (SC-FDE) method. The SC-FDMA scheme is similar to the OFDMA scheme in that data is modulated and demodulated in the time and frequency domains using a Discrete Fourier Transform (DFT), but is advantageous for reducing transmission power because the PAPR of a transmission signal is low. In particular, in relation to the use of the battery, the SC-FDMA scheme may be said to be advantageous in uplink communication from a terminal, sensitive to transmission power, to a base station. An important point when a terminal sends data to a base station is a wide coverage where power can be concentrated although the bandwidth of transmitted data is not great. An SC-FDMA system makes small a change in the signal and thus has a wider coverage than other systems when the same power amplifier is used because.

In order to apply an MIMO transmission scheme for sending multiple codewords to an SC-FDMA system, not only a single carrier characteristic, but also a low PAPR has to be guaranteed. If a DFT-spread signal is switched in a resource element unit and mapped to frequency resources, a low PAPR cannot be guaranteed after IFFT. Accordingly, there is a need for a method of sending multiple codewords, capable of performing MIMO transmission while maintaining a low PAPR.

DISCLOSURE

Technical Problem

An object of the present invention is to provide a method of sending multiple codewords which has a low PAPR (Peak to Average Power Ratio) in a multi-antenna-based SC-FDMA (Single Carrier-Frequency Division Multiple Access) system.

Technical Solution

An aspect of the present invention provides a method of transmitting multiple codewords in a wireless communication system using a plurality of transmission antennas. The method includes generating a plurality of parallel codewords by encoding a plurality of parallel information bit streams, generating a plurality of parallel modulated symbol streams by modulating the plurality of parallel codewords, generating a plurality of frequency domain symbol streams by performing Discrete Fourier Transform (DFT) on the modulated symbol streams, precoding the plurality of frequency domain symbol streams, mapping the precoded frequency domain symbol streams onto resource elements, generating Single Carrier Frequency Division Multiple Access (SC-FDMA) symbols by performing Fast Fourier Transform (IFFT) on the plurality of frequency domain symbol streams, performing shifting that changes layers to which the plurality of parallel codewords, the plurality of parallel modulated symbol streams, or the plurality of frequency domain symbol streams is mapped at a predetermined time interval, and transmitting the SC-FDMA symbols.

Another aspect of the present invention provides an apparatus for transmitting multiple codewords in a wireless communication system using a plurality of transmission antennas. The apparatus includes encoders for generating a plurality of parallel codewords by encoding a plurality of parallel information bit streams, mappers for generating a plurality of parallel modulated symbol streams by modulating the plurality of parallel codewords, DFT units for generating a plurality of frequency domain symbol streams by performing Discrete Fourier Transform (DFT) on the modulated symbol streams, a precoder for precoding the plurality of frequency domain symbol streams, resource element mappers for mapping the precoded frequency domain symbol streams onto resource elements, signal generators for generating Single Carrier Frequency Division Multiple Access (SC-FDMA) symbols by performing Fast Fourier Transform (IFFT) on the plurality of frequency domain symbol streams, a shifting unit for performing shifting that changes layers to which the plurality of parallel codewords, the plurality of parallel modulated symbol streams, or the plurality of frequency domain symbol streams is mapped at a predetermined time interval, and the plurality of transmission antennas for sending the SC-FDMA symbols.

Advantageous Effects

Multiple codewords having a low PAPR can be transmitted in an SC-FDMA system using the method proposed by the present invention.

MODE FOR INVENTION

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). CDMA may be implemented using radio technologies, such as Universal Terrestrial Radio Access (UTRA) or CDMA2000. TDMA may be implemented using radio technologies, such as Global System for Mobile communications (GSM)/General Packet Radio Service (GPRS)/Enhanced Data Rates for GSM Evolution (EDGE). OFDMA may be implemented using radio technologies, such as IEEE (Institute of Electrical and Electronics Engineers) 802.11 (Wi-Fi), IEEE 802.16 (WiMAX), IEEE 802-20, and Evolved UTRA (E-UTRA). UTRA is part of the Universal Mobile Telecommunications System (UMTS). $3^{rd}$ Generation Partnership Project (3GPP) Long Term Evolution (LTE) is part of Evolved UTMS (E-UMTS) using E-UTRA. The 3GPP LTE adopts OFDMA in downlink and SC-FDMA in uplink.

In order to clarify a description, 3GPP LTE is mainly described below, but the technical spirit of the present invention is not limited thereto. A multi-antenna system or an MIMO system to which the following technologies are applied is a system using multiples transmission antennas and at least one reception antenna. The following technologies may be applied to a variety of MIMO schemes. The MIMO scheme may be divided into spatial diversity in which the same stream is sent through multiples layers and Spatial Multiplexing (SM) in which multiple streams are sent through multiples layer.

In spatial multiplexing, a case where multiple streams are sent to one user is called Single User-MIMO (SU-MIMO) or Spatial Division Multiple Access (SDMA), and a case where multiple streams are sent to a number of users is called Multi-User-MIMO (MU-MIMO). Each of spatial diversity and spatial multiplexing may be divided into an open-loop method and a closed-loop method according to whether feedback information reported by each user is used.

Figure 1:
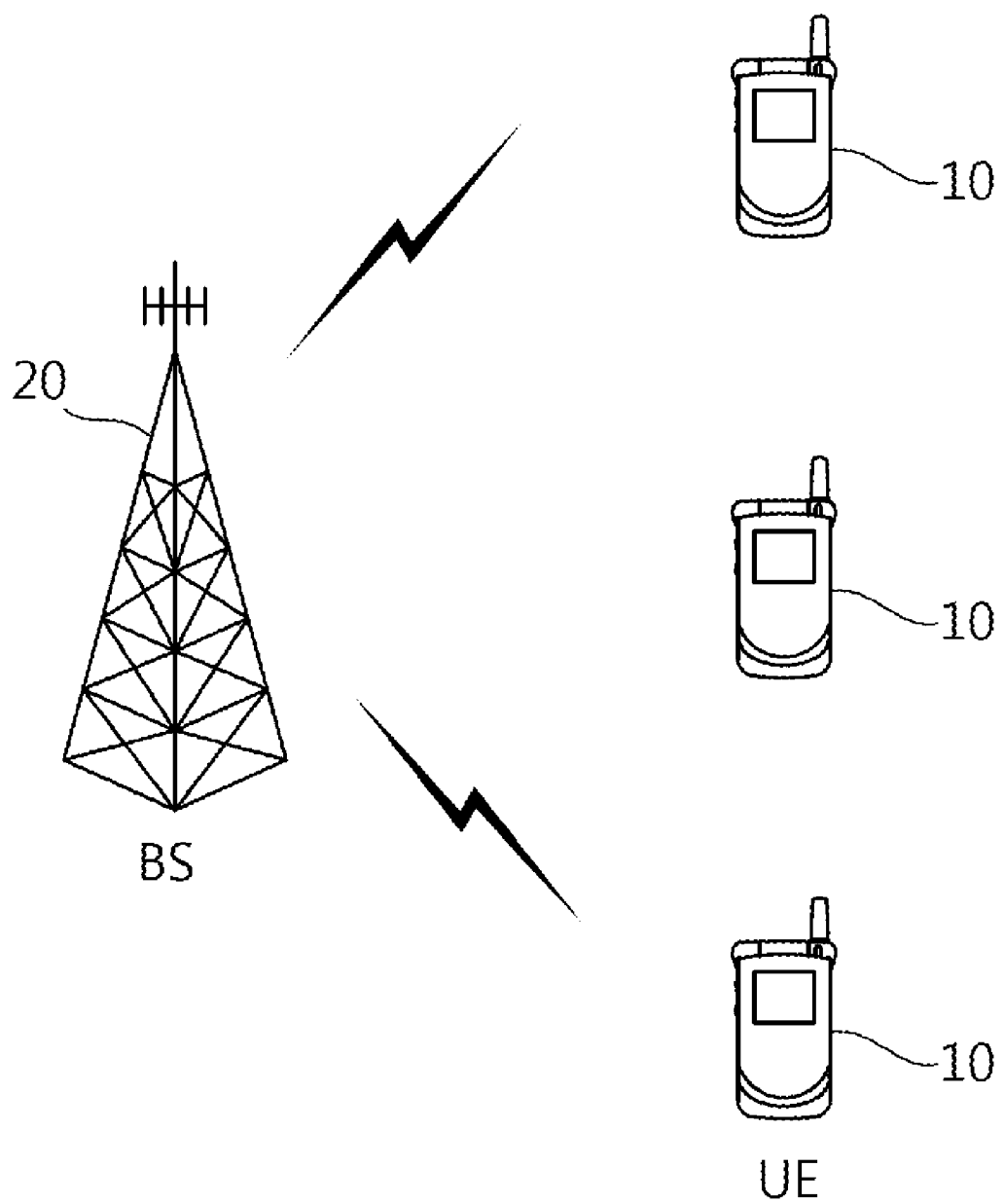
FIG. 1 is a diagram showing a wireless communication system.

FIG. 1 is a diagram showing a wireless communication system. The wireless communication systems are widely deployed in order to provide various communication services, such as voice and packet data.

Referring to FIG. 1, the wireless communication system includes User Equipments (UEs) 10 and a Base Station (BS) 20. The UE 10 may be fixed or mobile and may be called another terminology, such as a Mobile Station (MS), a User Terminal (UT), a Subscriber Station (SS), or a wireless device. The BS 20 commonly refers to a fixed station communicating with the UEs 10, and it may be called another terminology, such as a node-B, a Base Transceiver System (BTS), or an access point. One or more cells may exist in one base station 20.

It is hereinafter assumed that downlink (DL) refers to communication from the BS 20 to the UE 10 and uplink (UL) refers to communication from the UE 10 to the BS 20. In downlink, a transmitter may be part of the BS 20 and a receiver may be part of the UE 10. In uplink, a transmitter may be part of the UE 10 and a receiver may be part of the BS 20.

Figure 2:
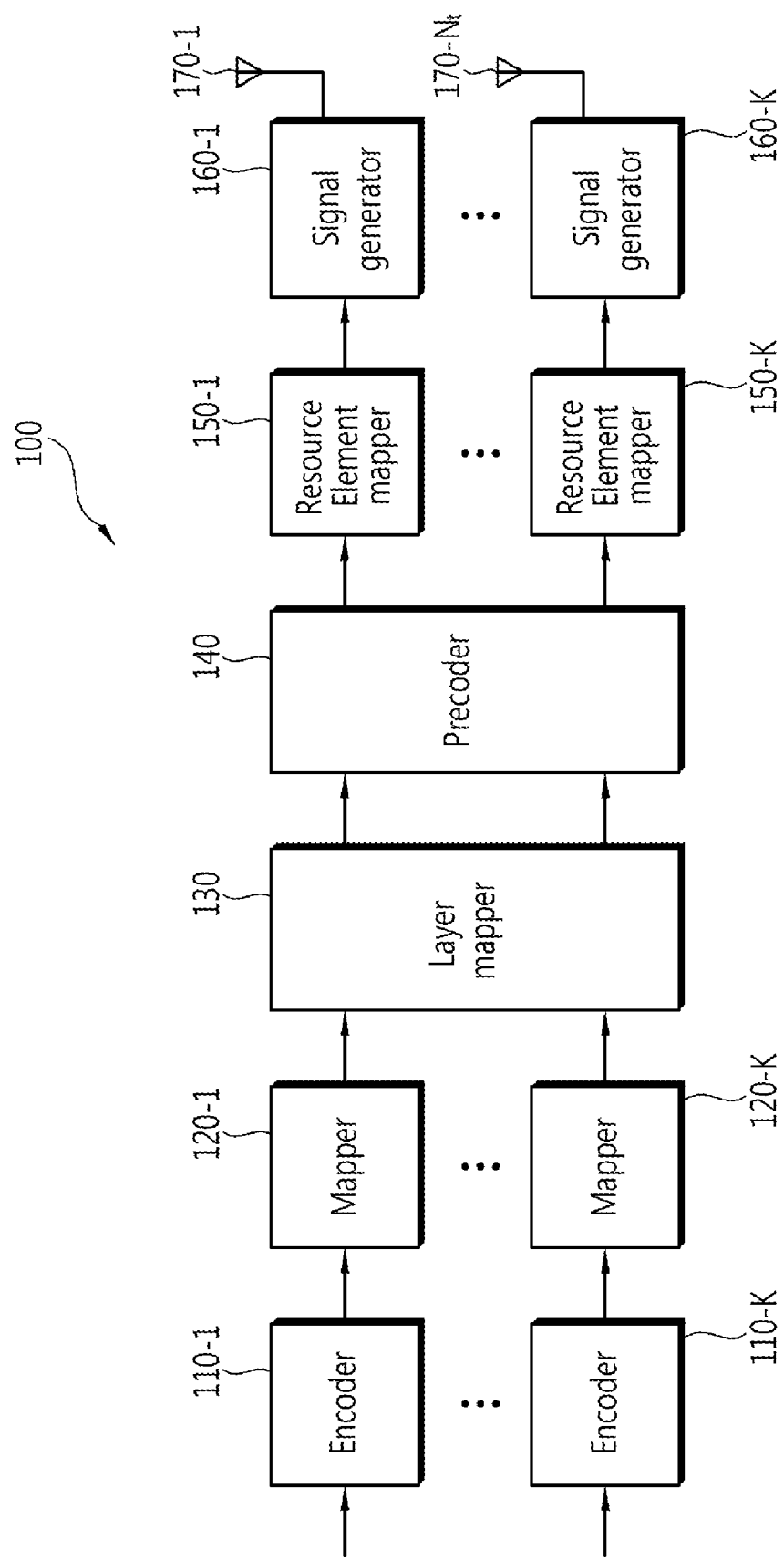
FIG. 2 is a block diagram showing the construction of a transmitter including multiple antennas.

FIG. 2 is a block diagram showing the construction of a transmitter including multiple antennas.

Referring to FIG. 2, the transmitter 100 includes encoders 110-1 to 110-K, mappers 120-1 to 120-K, a layer mapper 130, a precoder 140, resource element mappers 150-1 to 150-K, and signal generators 160-1 to 160-K. The transmitter 100 includes Nt transmission antennas 170-1 to 170-Nt.

The encoders 110-1 to 110-K form coded data (hereinafter referred to as a 'codeword') by encoding input data according to a predetermined coding method. The mappers 120-1 to 120-K map the codeword to modulated symbols which represent locations on a signal constellation signal constellation. The modulation scheme is not specially limited and, for example, an m-Phase Shift Keying (m-PSK) or m-Quadrature Amplitude Modulation (m-QAM) scheme may be used as the modulation scheme. For example, the m-PSK method may be a BPSK, QPSK, or 8-PSK scheme, and the m-QAM may be a 16-QAM, 64-QAM, or 256-QAM scheme.

The layer mapper 130 defines the layer of the modulated symbols so that the precoder 140 can distribute antenna-specific symbols into the paths of respective antennas. The layer may be defined as an information path to the precoder 140. An information path anterior to the precoder 140 may be called a virtual antenna or a virtual layer.

The precoder 140 processes the modulated symbols in accordance with an MIMO scheme according to the multiple transmission antennas 170-1 to 170-Nt and outputs antenna-specific symbols. The precoder 140 distributes the antenna-specific symbols into the resource element mappers 150-1 to 150-K of the respective antennas.

Each piece of information path sent to one antenna by the precoder 140 is called a stream and may be called a physical antenna.

The resource element mappers 150-1 to 150-K allocate the antenna-specific symbols to proper resource elements, and the mapped antenna-specific symbols may be multiplexed according to a user. The signal generators 160-1 to 160-K modulate the antenna-specific symbols according to an OFDM scheme and outputs transmission signals. The signal generators 160-1 to 160-K may generate the transmission signals using a variety of multi-access methods, such as the OFDMA and SC-FDMA methods. The transmission signals are transmitted through the respective antenna ports 170-1 to 170-Nt.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad \text{[Equation 1]}$$

In Equation 1, the precoding matrix W(i) is a Pxu matrix and i=0,1 to Mlayersymb−1.

The precoding matrix W(i) is a matrix for mapping the layers to antenna ports. The precoding matrix may include at least one of an identity matrix, a permutation matrix, an identity matrix, an antenna selection matrix, and an antenna combining matrix. The identity matrix is a square matrix, and it maps layers and antenna ports in a one-to-one way. The sizes of the identity matrix and the antenna selection matrix are determined by the number of layers and the number of antenna ports. The antenna combining matrix combines antenna ports so that one layer is transmitted through a plurality of antenna ports. The following table shows an example of matrices which may be included in the precoding matrix.

TABLE 2

| Identity Matrix | Permutation Matrix | Unitary Matrix | Antenna Selection Matrix | Antenna Combining Matrix |
|---|---|---|---|---|
| $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\begin{bmatrix} 0 & 0 & 0 & 1 \\ 0 & 0 & 1 & 0 \\ 0 & 1 & 0 & 0 \\ 1 & 0 & 0 & 0 \end{bmatrix}$ | $\frac{1}{\sqrt{2}}\begin{bmatrix} 1 & 1 \\ 1 & j \\ 1 & -1 \\ 1 & -j \end{bmatrix}$ | $\begin{bmatrix} 1 & 0 \\ 0 & 0 \\ 0 & 1 \\ 0 & 0 \end{bmatrix}$ | $\begin{bmatrix} \alpha & 0 \\ be^{j\theta k} & 0 \\ 0 & \alpha \\ 0 & be^{j\theta k} \end{bmatrix}$ |

An example of the 3GPP LTE standard regarding a mapping relation between the codeword and the layer is as follows. In accordance with Paragraph 6.3 of 3GPP TS 36.211 V8.0.0 (2007-09), in the 3GPP LTE standard, modulated symbols $d^{(q)}(0)$ to $d^{(q)}(M^{(q)}_{symb}-1)$ for a codeword q are mapped to a layer $x(i)=[x^{(0)}(i) \text{ to } x^{(u-1)}(i)]^T$ (i=0,1 to $M^{layer}_{symb}-1$). Here, $M^{(q)}_{symb}$ is the number of modulated symbols for the codeword q, u is the number of layers, and $M^{layer}_{symb}$ is the number of modulated symbols per layer. A codeword-to-layer mapping relationship for spatial multiplexing is listed in Table 1.

TABLE 1

| Number of layers | Number of code words | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$ $x^{(1)}(i) = d^{(1)}(i)$ | $M^{layer}_{symb} = M^{(0)}_{symb} = M^{(1)}_{symb}$ |
| 2 | 1 | $x^{(0)}(i) = d^{(0)}(2i)$ $x^{(1)}(i) = d^{(0)}(2i + 1)$ | $M^{layer}_{symb} = M^{(0)}_{symb}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M^{layer}_{symb} = M^{(0)}_{symb}/2 = M^{(1)}_{symb}/2$ |

Figure 3:
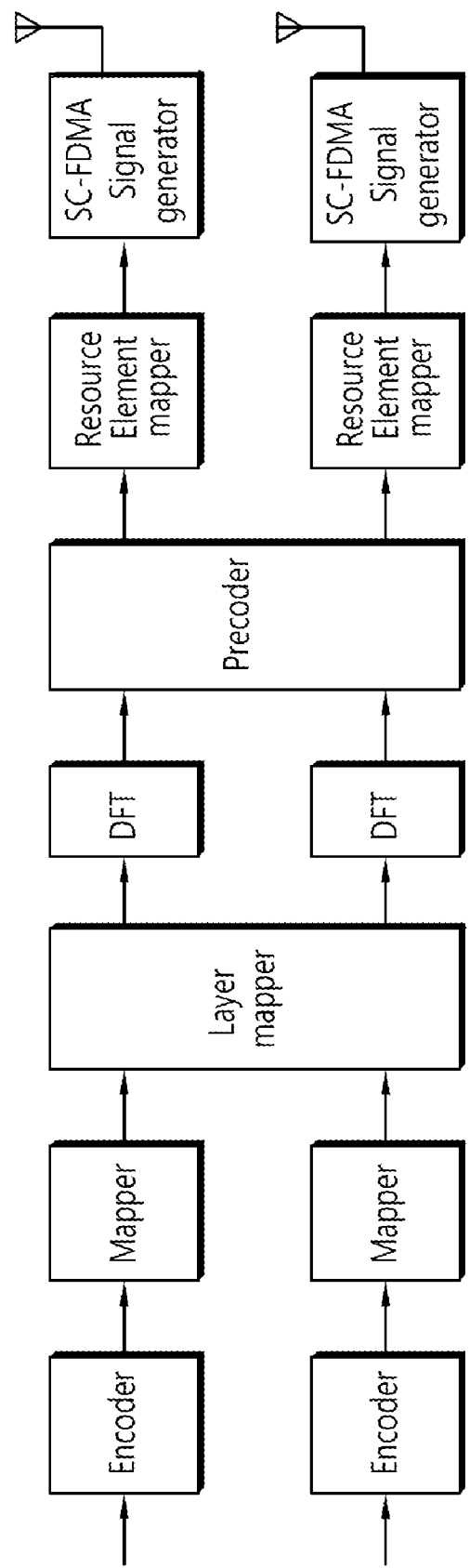
FIG. 3 is a block diagram showing the construction of an SC-FDMA transmitter including multiple antennas.

According to the above table, the 3GPP LTE standard supports the transmission of up to two codewords for up to four layers. FIG. 3 shows codeword-to-layer mapping for Table 1.

Each of the layers is precoded as in Equation below through a precoding matrix W(i), so that a signal $y^{(p)}(i)$ for a $p^{th}$ antenna port is generated.

Figure 4:
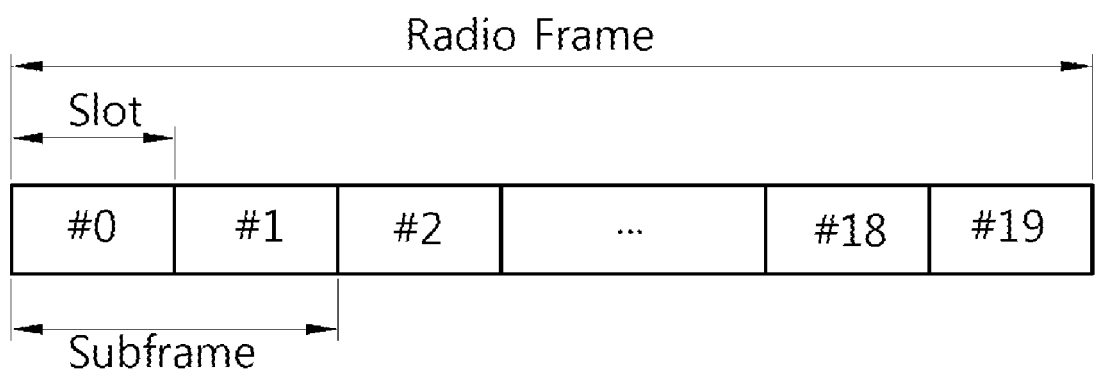
FIG. 4 shows the structure of an uplink radio frame.

FIG. 4 shows the structure of a radio frame in 3GPP LTE. The radio frame consists of 10 subframes. Each of the subframes includes 2 slots. The time that it takes to send one subframe is called 1 Transmission Time Interval (TTI). For example, the length of one subframe may be 1 ms, and the length of one slot may be 0.5 ms. One slot includes a number of SC-FDMA symbols in the time domain and number of subcarriers in the frequency domain. Hereinafter, an SC-FDMA symbol refers to a time domain symbol, and it may be called an OFDM symbol, a symbol interval or the like according to systems.

The number of SC-FDMA symbols included in one slot may vary according to the configuration of a Cyclic Prefix (CP). The CP includes an extended CP and a normal CP shorter than an extended CP. For example, in the case where SC-FDMA symbols are composed according to the normal CP, the number of SC-FDMA symbols included in one slot may be 7. In the case where the SC-FDMA symbols are composed according to the extended CP, the number of SC-FDMA symbols included in one slot is smaller than the number of SC-FDMA symbols included in one slot according to the normal CP because the length of one OFDM symbol is increased. For example, the number of SC-FDMA symbols included in one slot may be 6. The extended CP may be used in order to further reduce inter-symbol interference when a channel state is unstable as in the case where a UE fast moves. In the case where the normal CP is used, one slot includes 7 SC-FDMA symbols and thus one subframe includes 14 SC-FDMA symbols.

The structure of the radio frame is only illustrative. The number of subframes included in a radio frame, the number of slots included in a subframe, or the number of SC-FDMA symbols included in a slot may be changed in various ways.

Figure 5:
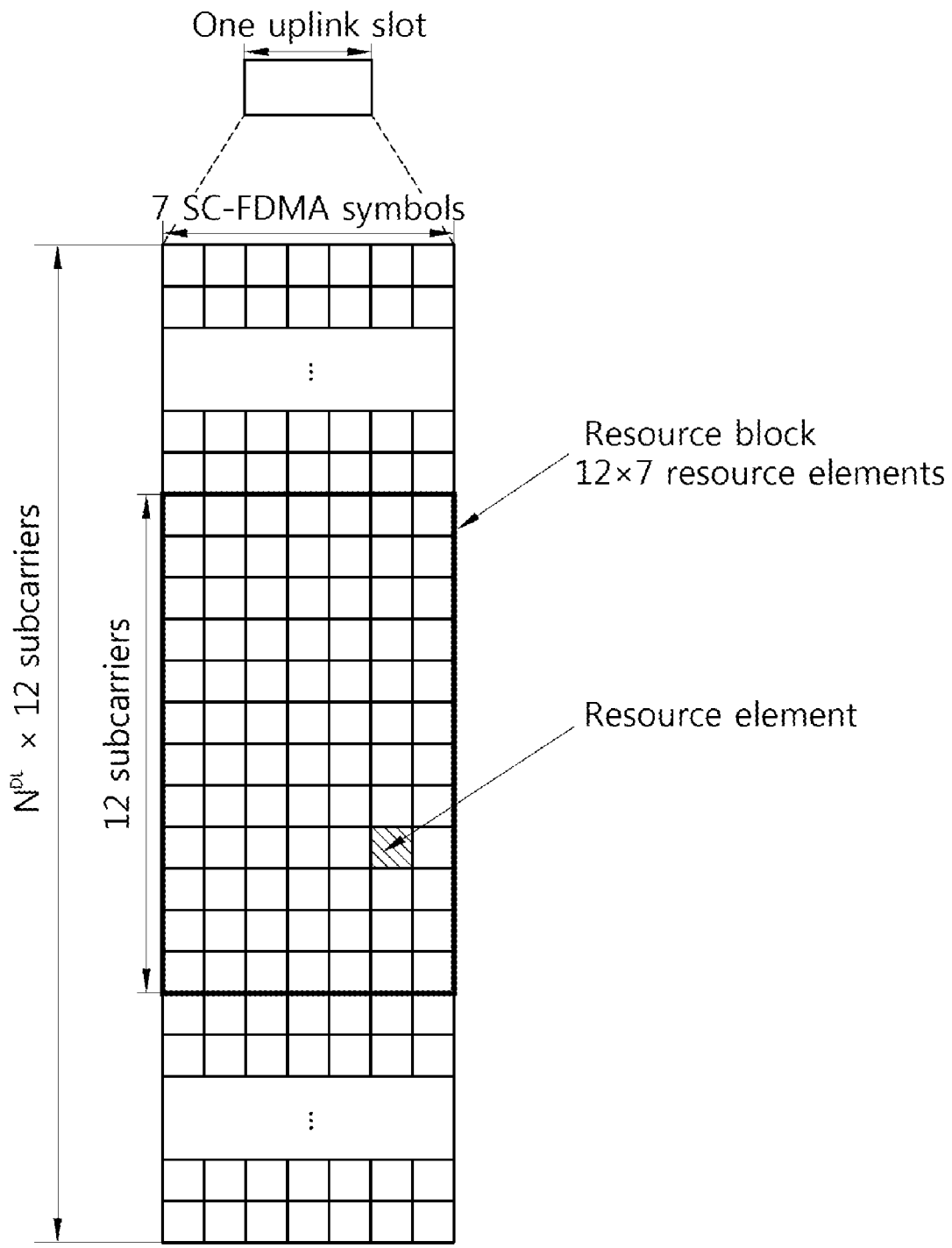
FIG. 5 shows an example of a resource grid for one uplink slot.

FIG. 5 shows an example of a resource grid for one uplink slot in 3GPP LTE. FIG. 5 shows a case where SC-FDMA symbols are composed according to the normal CP. An uplink slot includes a number of SC-FDMA symbols in the time domain. Here, one uplink slot is illustrated to include 7 SC-FDMA symbols and one resource block is illustrated to include 12 subcarriers, but they are only examples and the technical spirit of the present invention is not limited thereto. Each of elements on the resource grid is called a resource element. For example, a resource element a(k,l) is a resource element placed at a $k^{th}$ SC-FDMA symbol and an $l^{th}$ subcarrier. One resource block includes 12×7 resource elements. Assuming that the interval between subcarriers is 15 kHz, one resource block uses about 180 kHz in the frequency domain. $N^{UL}$ is the number of resource blocks included in an uplink slot. $N^{UL}$ is dependent on an uplink transmission bandwidth set according to the scheduling of a BS.

A system in which multiple codewords are used is advantageous in that it can increase the transmission rate by applying an optimized Modulation and Coding Scheme (MCS) to channel conditions in which codewords are transmitted. In an MIMO system, a transmitter can maximize the sum capacity of transmission layers or the capacity of a specific layer by using a precoding scheme. A transmitter using multiple codewords selects an MCS which is determined according to precoding and is suitable for the capacity of each layer. A receiver can improve its performance using a method, such as Minimum Mean Square Error-Successive Interference Cancellation. An MIMO system can profit if it efficiently maps multiple codewords to a plurality of layers because it can support a plurality of layers.

In a UE, the PAPR characteristic for reducing the consumption of the battery is important. For this reason, in 3GPP LTE, SC-FDMA in which IFFT is performed on a DFT-spread signal is adopted. 3GPP LTE does not take multiple antennas into consideration in uplink. Although a UE has multiple antennas, 3GPP LTE supports only the exchange of antennas, but does not support spatial multiplexing. Accordingly, how will multiple antennas be supported becomes a problem in an SC-FDMA system. If multiple antennas are supported, it is necessary to maintain a low PAPR characteristic in an SC-FDMA system. Furthermore, there is a need for a method of reducing the amount of fee dBack information in a multi-antenna system, such as control information (for example, a CQI, an MCS, a PMI, and an RI) which is transmitted in uplink in order to efficiently use insufficient uplink resources.

An MIMO transmission method in a multi-antenna system includes an open-loop method and a closed-loop method. The closed-loop method is a method of performing precoding according to channel conditions based on fee dBack information. The open-loop method is a method of performing precoding irrespective of channel conditions because it does not use fee dBack information. In the two kinds of the MIMO transmission methods, the following method may be taken into consideration in order to reduce fee dBack overhead.

A spatial multiplexing scheme using multiple codewords may be difficult to be used because its accuracy may be deteriorated if channels are abruptly changed. However, if a shifting scheme for distributing each of codewords into several layers and sending the codewords, instead of sending a specific codeword through a specific layer, is used, robust transmission is possible although an MCS for data transmission is selected based on an inaccurate Channel Quality Indicator (CQI) because each codeword experiences average channel conditions. Furthermore, if the shifting method is used, overhead for MCS bits used for data transmission can be reduced when multiple codewords are used.

According to the present invention, the shifting scheme (that is, a method of changing and distributing each codeword, a modulated symbol, or a frequency domain symbol into several layers and sending them) is described in detail. The shifting scheme commonly refers to a method of distributing multiple codewords, modulated symbols, or frequency domain symbols into several layers or transmission antennas (virtual antennas or physical antennas) and sending them. For example, a first codeword is not necessarily mapped to a first layer, but may be selectively mapped to a second layer. In other words, shifting is also called a layer shift, layer permutation, or layer mixing in that the mapping relationship between a codeword and a layer is not fixed, but may be changed. One or more modulated symbols, the bits of one or more codewords, and the bits of a piece of information are mixed by shifting.

A transmitter to which the shifting scheme is applicable is first described.

Figure 6:
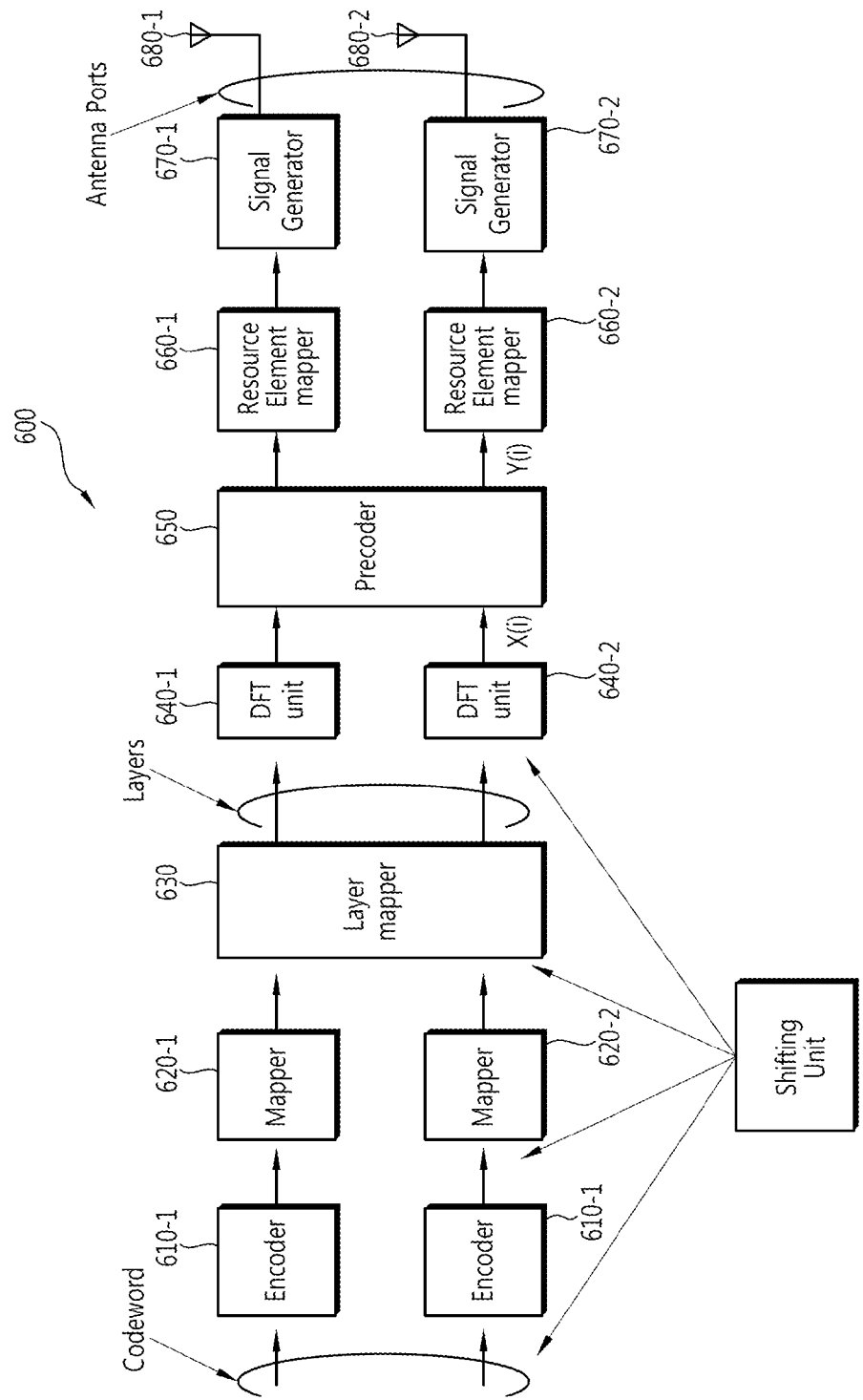
FIG. 6 is a block diagram showing a transmitter according to an example of the present invention.

FIG. 6 is a block diagram showing a transmitter according to an example of the present invention. FIG. 6 shows a case where two parallel codewords are used as input.

Referring to FIG. 6, the transmitter 600 includes encoders 610-1 and 610-2, mappers 620-1 and 620-2, a layer mapper 630, DFT units 640-1 and 640-2, a precoder 650, resource element mappers 660-1 and 660-2, signal generators 670-1 and 670-2, and antenna ports 680-1 and 680-2. The first encoder 610-1 generates a first codeword CW1 by encoding first information bits. The second encoder 610-2 generates a second codeword CW2 by encoding second information bits. The mappers 620-1 and 620-2 map the first and second codewords CW1 and CW2 to modulated symbols according to respective modulation schemes. The layer mapper 630 maps the modulated symbols of the first codeword CW1 and the modulated symbols of the second codeword CW2 to a plurality of layers, thus generating mapped symbols. The number of layers is equal to the value of a rank. The DFT units 640-1 and 640-2 generate DFT-spread symbols by performing DFT spread on the mapped symbols. The precoder 650 processes the DFT-spread symbols using a precoding matrix according to an MIMO scheme and outputs antenna-specific symbols. The precoder 650 distributes the antenna-specific symbols into the resource element mappers 660-1 and 660-2 of the respective antennas. Each information path sent to one antenna by the precoder 650 is called a stream. This may be called a physical antenna.

The resource element mappers 660-1 and 660-2 allocate the antenna-specific symbols to proper resource elements, and the allocated symbols may be multiplexed according to a user. The signal generators 670-1 and 670-2 modulate the antenna-specific symbols using a variety of multi-access methods, such as OFDMA and SC-FDMA, and output first and second transmission signals. Accordingly, the first and second transmission signals may be OFDM signals (or OFDM symbols) or SC-FDMA signals (SC-FDMA symbols) according to a modulation scheme. The first and second transmission signals are transmitted through the respective antenna ports 680-1 and 680-2.

Shifting may be performed before and after each of the elements disposed in front of the precoder 650 of the transmitter 600. For example, shifting may be performed between the encoders 610-1 and 610-2 and the mappers 620-1 and 620-2, between the mappers 620-1 and 620-2 and the layer mapper 630, and between the layer mapper 630 and the DFT units 640-1 and 640-2.

Processing in a codeword level is performed before the layer mapper 630. Accordingly, shifting performed before the layer mapper 630 is called shifting in a codeword level, and shifting performed after the layer mapper 630 is called shifting in a layer level. Meanwhile, in order to clearly distinguish antennas, the concept of a virtual antenna and a physical antenna is introduced. The virtual antenna is also called a logical antenna. The virtual antenna refers to a virtual antenna to which each layer is simply mapped. Accordingly, the number of virtual antennas is equal to the number of layers. On the other hand, the physical antenna refers to a substantial physical antenna after precoding. Accordingly, the physical antenna is not related to a layer, and the number of physical antennas is not equal to the number of virtual antennas. In general, an antenna in a level before the precoder 650 is called a virtual antenna, and an antenna in a level after the precoder 650 is called a physical antenna. Shifting performed in the virtual antenna level or the physical antenna level is called shifting in an antenna level.

In the present invention, in the layer and virtual antennas, a level before the DFT units 640-1 and 640-2 is called a layer level, a level after the DFT units 640-1 and 640-2 is called a virtual antenna level, and a level after the precoder 650 is a physical antenna level, for convenience' sake, but this should not be constructed as limiting their meanings Meanwhile, assuming that a certain time that a specific shifting scheme continues is a shifting period, shifting may be performed in a period of an SC-FDMA symbol, a number of SC-FDMA symbols, or a slot.

A detailed method of performing shifting according to each case and a method of efficiently determining the MCS of each codeword upon shifting according to the present invention are described below. A shifting scheme is different according to where means (precoding, spatial multiplexing, STC, beamforming, CDD, etc.) for performing MIMO transmission is placed. A method of performing shifting in the case where the precoder is placed before the resource element mappers is first described.

(1) In the case where the precoder is placed in front of the resource element mapper Method of Performing Shifting for every Slot in the Antenna Level This method is a method of performing shifting in the slot unit (a bundle of SC-FDMA symbols) in the rear of the DFT unit of an SC-FDMA system. In FIG. 6, shifting may be performed in the slot before or after a DFT-spread symbol stream is precoded in the rear of the DFT unit of an SC-FDMA system.

For example, in a system using two codewords, during one slot time, a first codeword (or the DFT-spread symbol stream of a first layer) may be mapped to first antenna resources and a second codeword (or the DFT-spread symbol stream of a second layer) may be mapped to second antenna resources. During a next slot time, the first codeword (or the DFT-spread symbol stream of the first layer) and the second codeword (or the DFT-spread symbol stream of the second layer) are shifted. Consequently, the second codeword (or the DFT-spread symbol stream of the second layer) and the first codeword (or the DFT-spread symbol stream of the first layer) may be mapped to the second antenna resources and the first antenna resources, respectively.

Here, the antenna may refer to the virtual antenna before precoding or the physical antenna after precoding, and shifting for every slot may be performed in the virtual or physical antenna level. Furthermore, the antenna shifting may be performed by including a precoding weight in the shifting matrix. Since shifting is performed in the DFT-spread symbol stream unit as described above, there is an advantage in that a low PAPR can be maintained.

The method of performing shifting for every slot may also be performed in the slot unit (a bundle of SC-FDMA symbols) before the DFT units.

Method of Performing Shifting in the SC-FDMA Symbol Unit in the Antenna Level

This method is a method of performing shifting in the SC-FDMA symbol unit after the DFT unit of an SC-FDMA system. Such shifting may be performed in the SC-FDMA symbol unit before a DFT-spread symbol stream is precoded. For example, the DFT-spread symbol stream of a first codeword may be mapped to a first antenna (here, the DFT-spread symbol stream of a second codeword may be mapped to a second antenna) for a certain SC-FDMA symbol time and may be mapped to the second antenna for a certain SC-FDMA symbol time (here, the DFT-spread symbol stream of the second codeword may be mapped to the first antenna). The method can be identically applied to the DFT-spread symbol stream of a layer.

In the method of performing shifting in the SC-FDMA symbol unit, shifting may be performed in the SC-FDMA symbol unit before the DFT units. Here, the number of SC-FDMA symbols in which a codeword or a layer is mapped to an antenna may be even or uneven for every antenna.

For example, a system for sending data and a reference symbol for a certain period of time may be taken into consideration. Here, a specific SC-FDMA symbol may be used to send only a reference symbol. Assuming that a reference symbol is transmitted through an n number of SC-FDMA symbols from among an N number of SC-FDMA symbols, data may be transmitted using a k(=N−n) number of SC-FDMA symbols. Assuming that shifting is performed in the SC-FDMA symbol unit in the antenna level, the shifting may be sequentially applied to an N number of SC-FDMA symbols or may be sequentially applied to only data symbols. Although a greater number of specific codewords or specific layers may be mapped to a specific antenna in the former case, but the codewords or the layers may be evenly mapped to the antennas in the latter case.

A data symbol mapped between a codeword and a layer may be mapped to other layer through layer shifting. The following equation shows an example of the layer shifting.

$$\hat{x}^{(k_n)}(i) = x^{(n)}(i), k_n = \text{mod}(s+n, N) \quad \text{[Equation 2]}$$

In Equation 2, $x^{(n)}(i)$ is a layer-mapped data symbol, N is the number of layers, n is the index of a layer, and S is the index of a symbol or slot. A symbol may represent the index of only a data symbol included in a slot or subframe or may become an index including both data and a reference signal.

Layer shifting may also be represented by a shifting matrix. The shifting matrix may use a different shifting matrix in the SC-FDMA symbol unit or in the slot unit (that is, a bundle of SC-FDMA symbols). For example, in two layers, a shifting matrix and a precoding matrix may be determined by the following equation.

$$W(i) = C(i)P_k \, i=0,1,\ldots, M^{ap}_{symb}-1 \text{ where}$$
$$M^{ap}_{symb} = M^{layer}_{symbol} \quad \text{[Equation 3]}$$

In Equation 3, $P_k$ is a shifting matrix of 2×2, k=mod(s,2) (k=1,2), s is the index of a symbol or slot, and C(i) is a precoding matrix.

For another example, in three layers, a shifting matrix and a precoding matrix may be determined by the following equation.

$$W(i) = CP_k \, i=0,1,\ldots, M^{ap}_{symb}-1 \text{ where}$$
$$M^{ap}_{symb} = M^{layer}_{symbol} \quad \text{[Equation 4]}$$

In Equation 4, $P_k$ is a shifting matrix of 3×3, k=mod(s,3) (k=1,2,3), s is the index of a symbol or slot, and C is a precoding matrix.

For yet another example, in four layers, a shifting matrix and a precoding matrix may be determined by the following equation. Here, $W(i)=P_k$. This corresponds to a case where C is a unit matrix, as compared with Equation 4. There may be a case where four or two multiple codewords are transmitted through four layers. In this case, a shifting matrix and a precoding matrix may be determined as below so that all the multiple codewords experience the four layers. Here, the shifting matrix may use a different permutation matrix in the SC-FDMA symbol unit or in the slot unit (that is, a bundle of SC-FDMA symbols).

$$W(i)=P_k\ i=0,1,\ldots,M^{ap}_{symb}-1 \text{ where}$$
$$M^{ap}_{symb}=M^{layer}_{symbol} \quad\quad\quad \text{[Equation 5]}$$

In Equation 5, $P_k$ is a shifting matrix of 4×4, k=mod(s,4) (k=1,2,3,4), and s is the index of a symbol or slot. An example ($P_{401}$ to $P_{424}$) of the 4×4 shifting matrix is listed in the following table.

TABLE 3

(1) 1/2/3/4
$$P_{401}=\begin{bmatrix}1&0&0&0\\0&1&0&0\\0&0&1&0\\0&0&0&1\end{bmatrix}$$

(2) 2/1/3/4
$$P_{402}=\begin{bmatrix}0&1&0&0\\1&0&0&0\\0&0&1&0\\0&0&0&1\end{bmatrix}$$

(3) 3/1/2/4
$$P_{403}=\begin{bmatrix}0&1&0&0\\0&0&1&0\\1&0&0&0\\0&0&0&1\end{bmatrix}$$

(4) 4/1/2/3
$$P_{404}=\begin{bmatrix}0&1&0&0\\0&0&1&0\\0&0&0&1\\1&0&0&0\end{bmatrix}$$

(5) 1/2/4/3
$$P_{405}=\begin{bmatrix}1&0&0&0\\0&1&0&0\\0&0&0&1\\0&0&1&0\end{bmatrix}$$

(6) 2/1/4/3
$$P_{406}=\begin{bmatrix}0&1&0&0\\1&0&0&0\\0&0&0&1\\0&0&1&0\end{bmatrix}$$

(7) 3/1/4/2
$$P_{407}=\begin{bmatrix}0&1&0&0\\0&0&0&1\\1&0&0&0\\0&0&1&0\end{bmatrix}$$

(8) 4/1/3/2
$$P_{408}=\begin{bmatrix}0&1&0&0\\0&0&0&1\\0&0&1&0\\1&0&0&0\end{bmatrix}$$

(9) 1/3/2/4
$$P_{409}=\begin{bmatrix}1&0&0&0\\0&0&1&0\\0&1&0&0\\0&0&0&1\end{bmatrix}$$

(10) 2/3/1/4
$$P_{410}=\begin{bmatrix}0&0&1&0\\1&0&0&0\\0&1&0&0\\0&0&0&1\end{bmatrix}$$

(11) 3/2/1/4
$$P_{411}=\begin{bmatrix}0&0&1&0\\0&1&0&0\\1&0&0&0\\0&0&0&1\end{bmatrix}$$

(12) 4/2/1/3
$$P_{412}=\begin{bmatrix}0&0&1&0\\0&1&0&0\\0&0&0&1\\1&0&0&0\end{bmatrix}$$

(13) 1/3/4/2
$$P_{413}=\begin{bmatrix}1&0&0&0\\0&0&0&1\\0&1&0&0\\0&0&1&0\end{bmatrix}$$

(14) 2/3/4/1
$$P_{414}=\begin{bmatrix}0&0&0&1\\1&0&0&0\\0&1&0&0\\0&0&1&0\end{bmatrix}$$

(15) 3/2/4/1
$$P_{415}=\begin{bmatrix}0&0&0&1\\0&1&0&0\\1&0&0&0\\0&0&1&0\end{bmatrix}$$

(16) 4/2/3/1
$$P_{416}=\begin{bmatrix}0&0&0&1\\0&1&0&0\\0&0&1&0\\1&0&0&0\end{bmatrix}$$

(17) 1/4/2/3
$$P_{417}=\begin{bmatrix}1&0&0&0\\0&0&1&0\\0&0&0&1\\0&1&0&0\end{bmatrix}$$

(18) 2/4/1/3
$$P_{418}=\begin{bmatrix}0&0&1&0\\1&0&0&0\\0&0&0&1\\0&1&0&0\end{bmatrix}$$

(19) 3/4/1/2
$$P_{419}=\begin{bmatrix}0&0&1&0\\0&0&0&1\\1&0&0&0\\0&1&0&0\end{bmatrix}$$

(20) 4/3/1/2
$$P_{420}=\begin{bmatrix}0&0&1&0\\0&0&0&1\\0&1&0&0\\1&0&0&0\end{bmatrix}$$

(21) 1/4/3/2
$$P_{421}=\begin{bmatrix}1&0&0&0\\0&0&0&1\\0&0&1&0\\0&1&0&0\end{bmatrix}$$

TABLE 3-continued

(22) 2/4/3/1
$$P_{422}=\begin{bmatrix}0&0&0&1\\1&0&0&0\\0&0&1&0\\0&1&0&0\end{bmatrix}$$

(23) 3/4/2/1
$$P_{423}=\begin{bmatrix}0&0&0&1\\0&0&1&0\\1&0&0&0\\0&1&0&0\end{bmatrix}$$

(24) 4/3/2/1
$$P_{424}=\begin{bmatrix}0&0&0&1\\0&0&1&0\\0&1&0&0\\1&0&0&0\end{bmatrix}$$

If four codewords are transmitted through four layers, a subset from shifting matrices may be used. For example, each codeword may experience all the four layers through 24 shifting matrices. If four shifting matrices $P_{401}(1,2,3,4)$, $P_{414}(2,3,4,1)$, $P_{419}(3,4,1,2)$, and $P_{404}(4,1,2,3)$ are properly used, four codewords can experience all the four physical channels. This may be represented by the following equation.

$$W(i)=P_k\ i=0,1,\ldots,M^{ap}_{symb}-1 \text{ where}$$
$$M^{ap}_{symb}=M^{layer}_{symbol} \quad\quad\quad \text{[Equation 6]}$$

In Equation 6, $P_1=P_{401}$, $P_2=P_{419}$, $P_3=P_{414}$, and $P_4=P_{404}$, k=mod(s,N) (k=1,2,3,4), and s is the index of a symbol or slot. If s is the index of a symbol, N=4. If s is the index of a slot, N=2.

$P_k$ indicates a shifting matrix, and a shifting matrix may be different according to the number of layers. When shifting is performed, an antenna shifting may be performed by including a precoding weight in a shifting matrix. In at least one SC-FDMA symbol, the same shifting rule is applied.

Such shifting may be performed in one SC-FDMA symbol level or in the level of a number of SC-FDMA symbols. Shifting may also be performed in the level of one or more SC-FDMA symbol groups.

An antenna may refer to both the virtual antenna before precoding and the physical antenna after precoding. Shifting may be performed in the SC-FDMA symbol unit in the stage of the virtual or physical antenna.

In this case, since shifting is performed in the DFT-spread symbol stream unit, there is an advantage in that a low PAPR can be maintained. Furthermore, since shifting is performed in the SC-FDMA symbol unit, there are advantages in that SC-FDMA symbols can be spatially mixed more frequently and can be shifted more effectively when a lot of layers are transmitted.

Method of Performing Shifting for every Slot in the Layer Level (or Codeword Level)

This method is a method of performing shifting in the slot unit (that is, a bundle of SC-FDMA symbols) with respect to two or more layers or codewords before the DFT unit of an SC-FDMA system. The shifting may be performed in the slot before the modulated symbols of a codeword or a layer are subjected to DFT spread. FIG. 6 shows a case where shifting may be performed before the encoders, before the mapper, before the layer mapper, and so on.

For example, the modulated symbol stream of a first codeword (or a first layer) may be mapped to resources regarding a first antenna (or a first layer) during a first slot time and to resources regarding a second antenna (or a second layer) during a second slot time. At the same time, the modulated symbol stream of a second codeword (or a second layer) may be mapped to the resources regarding the second antenna (or the second layer) during a first slot time and to resources regarding the first antenna (or the first antenna) during a second slot time.

Here, the antenna may refer to a virtual antenna before precoding, and it may be used as the same meaning as a layer before DFT. Meanwhile, the resources regarding the antenna refer to radio resources allocated to each antenna. In the time domain before DFT, shifting is performed in the slot level. Accordingly, there is an advantage in that a low PAPR can be maintained.

Method of Performing Shifting in the SC-FDMA Symbol Unit in the Layer Level (or Codeword Level)

This method is a method of performing shifting on two or more layers or codewords before the DFT unit of an SC-FDMA system in the SC-FDMA symbol unit or in units of plural SC-FDMA symbols. Shifting may be performed in the SC-FDMA symbol unit before the symbol stream of a codeword or layer is subjected to DFT spread.

For example, the symbol stream of a first (or second) codeword or a first (or second) layer may be mapped to a first (or second) antenna during a certain SC-FDMA symbol time and to a second (or first) antenna during a certain SC-FDMA symbol time. The number of SC-FDMA symbols in which a codeword or layer is mapped to an antenna may be even or uneven for every antenna.

Here, shifting may be performed in the SC-FDMA symbol unit level or in the level of a number of SC-FDMA symbols. The antenna may refer to a virtual antenna before precoding, and it may be used as the same meaning as a layer before DFT.

In the time domain, shifting is performed in the SC-FDMA symbol unit before DFT. Accordingly, there is an advantage in that a low PAPR can be maintained. Furthermore, since shifting is performed in the SC-FDMA symbol unit, there are advantages in that SC-FDMA symbols can be spatially mixed more frequently and shifting can be performed more effectively when a lot of layers are transmitted.

V. Method of Performing Shifting on Bits Coded by Different Codewords

Figure 7:
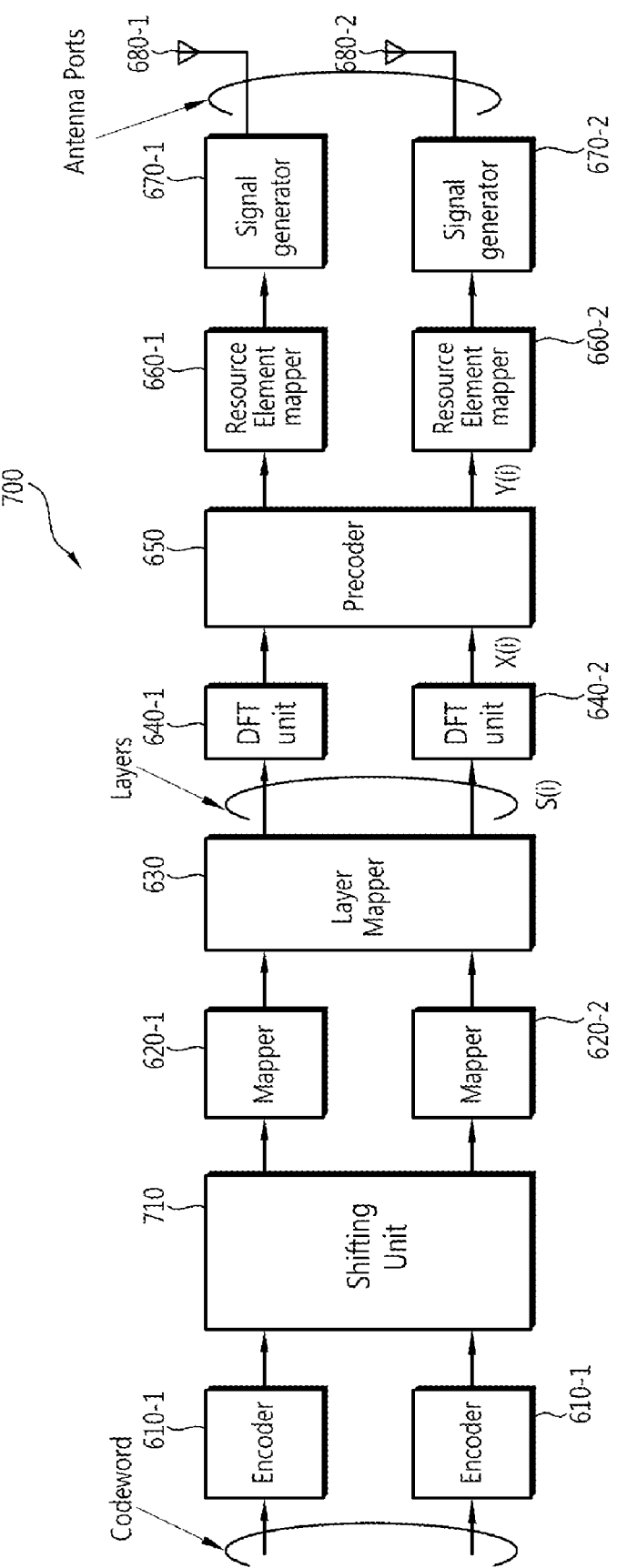
FIG. 7 is a block diagram showing a transmitter according to another example of the present invention.

FIG. 7 is a block diagram showing a transmitter according to another example of the present invention. FIG. 7 is different from FIG. 6 in that two parallel multiple codewords are used as input and a shifting unit is disposed between encoders and mappers.

Referring to FIG. 7, the transmitter 700 includes a shifting unit 710. The shifting unit 710 is disposed after encoders 610-1 and 610-2 and configured to perform shifting on bits coded by each codeword. In the case where each of codewords is transmitted through one layer, the modulated symbol streams of the codewords have the same length. Here, the bits of each codeword are shifted using a certain method and a bit stream is then mapped to each layer according to a modulation order. When a specific codeword is transmitted through an N(>1) layer, a modulated symbol stream has the length equal to N times of an allocated resource block. Accordingly, a shifted bit stream is mapped to a modulation stage by taking a modulation order and the number of transmission layers into consideration.

VI. Method of Performing Physical/Virtual Antenna or Layer Shifting Upon Hybrid Automatic Repeat Request (H-ARQ)

Shifting is not performed upon initial transmission, but is performed upon retransmission. A shifting scheme of a slot level, a symbol level, a modulated symbol level, or a coded bit level may be taken into consideration. When initial transmission is performed using shifting, the shifting scheme is used upon retransmission. Meanwhile, a different shifting sequence may be used. A shifting scheme of a different level (slot, symbol, modulated symbol, or coded bit) may be used.

Figure 8:
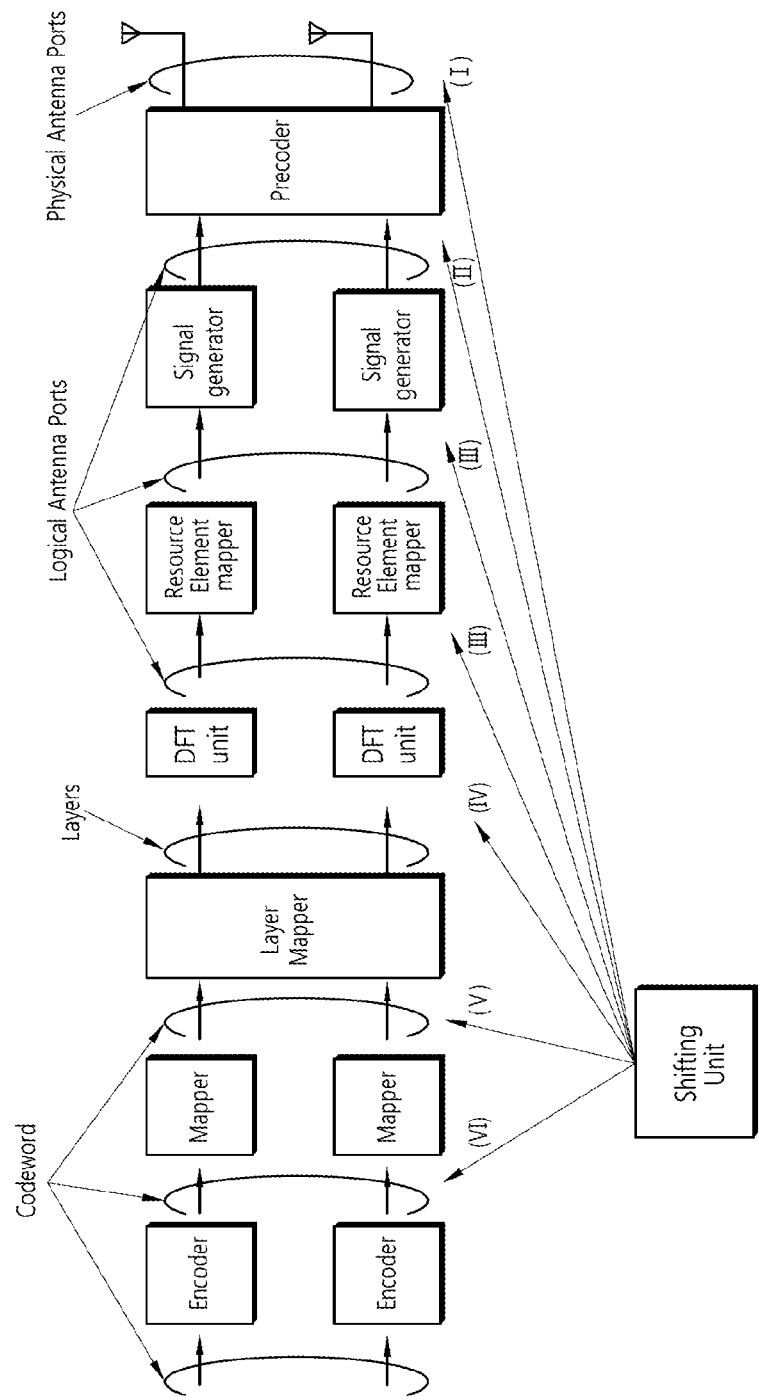
FIG. 8 is a block diagram illustrating a method of performing shifting in a system in which MIMO transmission is performed according to an example of the present invention.

(2) In the Case where Means for Performing MIMO Transmission is Placed after a Signal Generator FIG. 8 is a block diagram illustrating a method of performing shifting in a system in which MIMO transmission is performed according to an example of the present invention. The transmitter of FIG. 8 is the same as the transmitter of FIG. 6, but is different from the transmitter of FIG. 6 in that an MIMO processing unit is added.

Referring to FIG. 8, shifting may be performed in each codeword or layer or in each virtual antenna or physical antenna level as follows. Furthermore, shifting may be performed in the time domain or the frequency domain according to a point of time at which the shifting is performed. Here, the time domain becomes a stage before the DFT units and a stage after the SC-FDMA signal generators. The frequency domain ranges from a stage after the DFT units to a stage before the SC-FDMA signal generators. Eight forms of shifting are as follows: I. Shifting of the physical antenna level in the time domain, II. Shifting of the virtual antenna level in the time domain, III. Shifting of the virtual antenna level in the frequency domain, IV. Shifting of the layer level in the time domain, V. Shifting of the modulated symbol level in the time domain, and VI Shifting of the codeword level in the time domain.

The shifting scheme may be applied to systems using any MIMO transmission, such as precoding, spatial multiplexing (SM), STC, beamforming, and Cyclic Delay Diversity (CDC). In MIMO transmission using precoding, a precoding weight in the time domain is applied to the precoding. The unit of shifting may be a slot, a sample in the time domain, one SC-FDMA symbol, a number of SC-FDMA symbols, one modulated symbol, a number of modulated symbols, one coded bit, a number of coded bits, one information bit, or a number of information bits.

The eight forms of shifting are described below. The shifting forms III to VI are the same as the shifting form in the case where the precoder is placed at the front stage of the resource element mappers. Accordingly, only the shifting forms I to III are described below.

I. Shifting of the Physical Antenna Level in the Time Domain

An MIMO transmission unit functions to map an N number of virtual antennas to an M number of (M>N) physical antennas. Assuming that a p number of physical antennas to which one virtual antenna is mapped are one physical antenna group, the shifting of the physical antenna level is performed for every physical antenna group.

A codeword is mapped to a virtual antenna through layer mapping, and the virtual antenna is mapped to a physical antenna. The codeword may also be directly mapped to the physical antenna. Physical antennas may be grouped according to a codeword and are shifted for every physical antenna group. An interval at which shifting is performed may be a slot, one SC-FDMA symbol, a number of SC-FDMA symbols, or a time sample.

For example, in the case where the transmission of a rank 2 is performed using two physical antennas, an identity matrix, such as $$\begin{bmatrix} 1 & 0 \\ 0 & 1 \end{bmatrix},$$

or a shifting matrix (permutation matrix), such as $$\begin{bmatrix} 0 & 1 \\ 1 & 0 \end{bmatrix},$$

is used. The shifting matrix is used to perform shifting. An input matrix inputted to the shifting matrix is a virtual antenna signal of 2×1 in size, and an output matrix is a physical antenna signal of 2×1 in size. In this case, virtual antennas are mapped to respective physical antennas. Here, shifting may be performed in each physical antenna level. That is, a signal being transmitted through a first physical antenna may be switched to a second physical antenna in a certain unit time and then transmitted. Meanwhile, in the case where a shifting matrix in which the signals of first and second columns are added, such as $$\frac{1}{\sqrt{2}}\begin{bmatrix} 1 & 1 \\ 1 & -1 \end{bmatrix},$$

is used, a signal being transmitted through a first physical antenna may be switched to a second physical antenna in a certain time unit and then transmitted.

For another example, in the case where the transmission of a rank 2 is performed using four physical antenna, if a shifting matrix, such as $$\begin{bmatrix} 1 & 0 \\ 1 & 0 \\ 0 & 1 \\ 0 & 1 \end{bmatrix},$$

is used, a specific virtual antenna is mapped to two of the four physical antennas. Alternatively, in the case where two codewords are used and each of the codewords is mapped to two physical antennas, shifting may be performed using two physical antennas as a basic unit. A signal transmitted through first and second physical antennas may be switched to third and fourth physical antennas in a certain unit time and then transmitted. At the same time, a signal transmitted through the third and fourth physical antennas may be switched to the first and second physical antennas in a certain unit time and then transmitted. A plurality of physical antennas used to send one signal is a physical antenna group, and to determine a group of physical antennas is called the grouping of physical antennas. The grouping of physical antennas may be determined according to a precoding matrix.

Shifting may be performed using individual physical antennas as a basic unit irrespective of a precoding matrix or codeword. A signal transmitted through first, second, third, and fourth physical antennas may be switched to the second, third, fourth, and first physical antennas in a certain unit time and then transmitted. A different method of switching physical antennas may be used, but is not specially limited.

For yet another example, in the case where the transmission of a rank 3 is performed using four physical antennas, if a shifting matrix, such as $$\begin{bmatrix} 1 & 0 & 0 \\ 1 & 0 & 0 \\ 0 & 1 & 0 \\ 0 & 0 & 1 \end{bmatrix},$$

is used, a specific virtual antenna is mapped to two of the four physical antennas, and the remaining two virtual antennas are mapped to the remaining two physical antennas, respectively. The two specific physical antennas may form one group, and shifting may be performed on the one group and the remaining two physical antennas. For example, assuming that first and physical antennas form a group 1, a signal transmitted through the group 1 and the third and fourth physical antennas may be switched to the fourth physical antenna, the group 1, and the third physical antenna in a certain unit time and then transmitted. The grouping of physical antennas may be determined according to a precoding matrix.

Shifting may be performed using individual physical antennas as a basic unit irrespective of a precoding matrix or codeword. A signal transmitted through first, second, third, and fourth physical antennas may be switched to the second, third, fourth, and first physical antennas in a certain unit time and then transmitted. A different method of switching physical antennas may be used, but is not specially limited.

For yet another example, in the case where the transmission of a rank 4 is performed using four physical antenna, if a shifting matrix, such as $$\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

is used, virtual antennas are mapped to the four physical antennas, respectively. Accordingly, shifting may be performed by using a group of physical antennas, mapped to a codeword, as a basic unit. For example, in the case where two codewords are used, one of the codewords may be mapped to two of the four virtual antennas, and the other of the codewords may be mapped to the remaining two virtual antennas. Virtual antennas may be mapped to respective physical antennas. Accordingly, if shifting is performed, a codeword transmitted through first and second (or third and fourth) physical antennas may be switched to the third and fourth (or the first and second) physical antennas in a certain unit time and then transmitted. The grouping of physical antennas may be determined according to a precoding matrix. In the case where four codewords are used, shifting may be performed using each antenna as a basic unit. Shifting may be performed by using individual physical antennas as a basic unit irrespective of a precoding matrix or codeword.

II. Shifting of the Virtual Antenna Level in the Time Domain

Shifting may be performed in a unit of a virtual antenna group mapped to a codeword. A signal generated by the SC-FDMA signal generator is a time domain signal and is a signal of a virtual antenna. A codeword is mapped to a layer. The layer may be used as the same meaning as a virtual antenna. Accordingly, to map one codeword to a number of layers means that one codeword may be mapped to a number of virtual antennas.

For example, assuming that two codewords are transmitted through a rank 3, the first codeword may be mapped to a first physical antenna and the second codeword may be mapped to second and third physical antennas, in any shifting period. If shifting is performed in a codeword unit as described above, in a next shifting period, the first codeword may be switched and mapped to the third physical antenna and the second codeword may be switch and mapped to the first and second physical antennas. Likewise, shifting may be performed by using individual virtual antennas as a basic unit. Here, the certain unit time may be a slot, one SC-FDMA symbol, a number of SC-FDMA symbols, or one or a number of time samples. Shifting or switching may be performed according to the above units.

III. Shifting of the Virtual Antenna Level in the Frequency Domain

A DFT-spread signal is a frequency domain signal and is a signal of a virtual antenna level on which codeword-to-layer mapping has been performed. If a DFT-spread signal is shifted in a resource element unit and then mapped to frequency resources, a low PAPR may not be guaranteed after IFFT. In order to maintain a low Cubic Metric (CM) characteristic, a shifting scheme applied to a signal of the frequency domain should not be changed during a slot or the length of one SC-FDMA symbol, a number of SC-FDMA symbols.

(3) Method of Determining an MCS when Shifting is Performed in a Multi-Codeword System and of Efficiently Sending Information about the MCS In a system using multiple codewords, an MCS may be determined for every codeword. Accordingly, if shifting is performed in a multi-codeword system, codewords or modulated symbols having different modulation orders may be mixed and DFT-spread. Furthermore, symbols having the same modulation order may be DFT-spread, shifted in a period of SC-FDMA symbols or slots having different modulation orders, and then transmitted through a specific antenna. In this case, a CM characteristic according to the modulation order of each codeword or modulated symbol is changed.

TABLE 4

|  | QPSK | 16QAM | 64QAM | QPSK + 16QAM |
| --- | --- | --- | --- | --- |
| CM[dB] | 1.22 | 2.14 | 2.33 | 1.80 |

Table 4 shows CMs according to modulation orders in an SC-FDMA system. From Table 4, it can be seen that Quadrature Phase Shift Keying (QPSK) has a CM of 1.22 dB, 16QAM (Quadrature Amplitude Modulation) has a CM of 2.14 dB, and 64QAM has a CM of 2.33 dB. An FDMA symbol has a CM of 4 dB. It can also be seen that in the case where QPSK and 16QAM symbols are mixed, a CM is 1.80 dB. The probability of data transmission may be deteriorated owing to a phenomenon in which when data is transmitted, a signal is distorted by the non-linear interval of a power AMP. In order to prevent the deterioration of performance due to the distortion of the non-linear interval, there is a need for a method of selecting an MCS suitable for data transmission by controlling a Signal to Noise Ratio (SNR) by taking a CM into consideration. Hereinafter, a method of efficiently determining an MCS according to each codeword and of sending information about the MCS is described.

Figure 9:
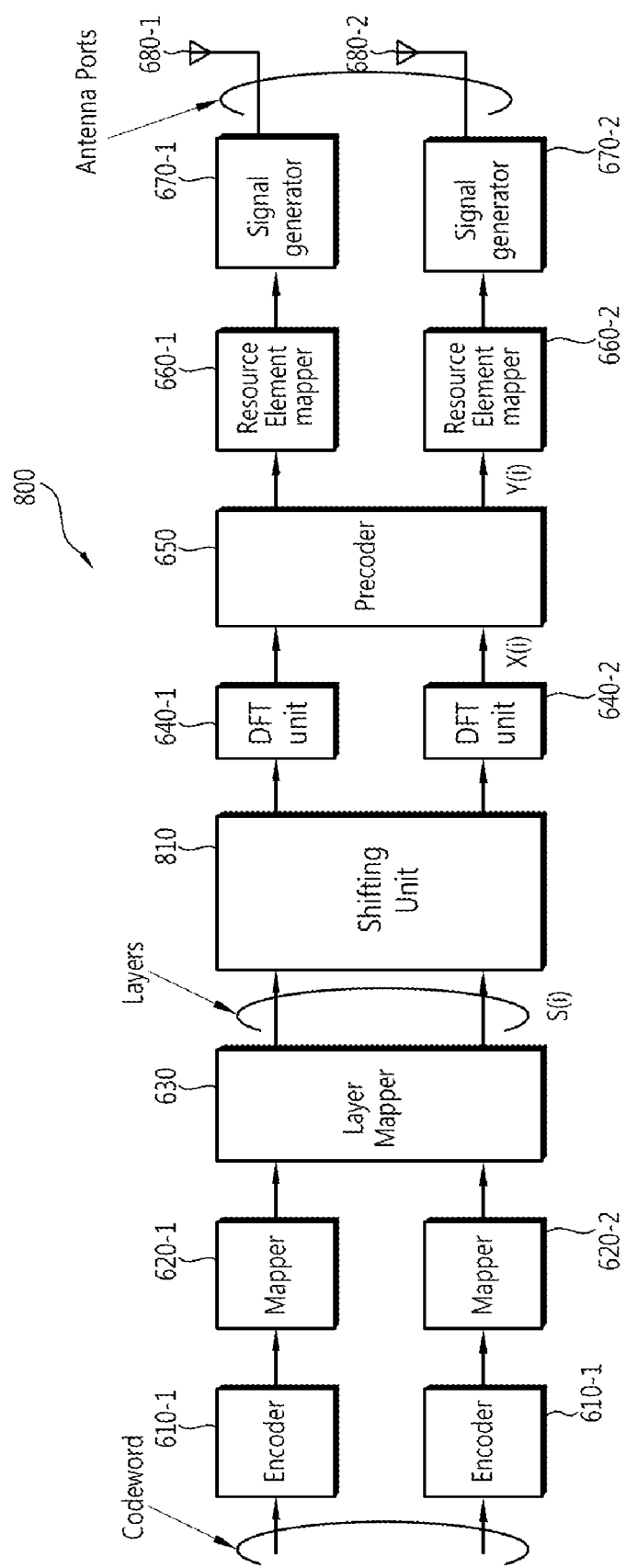
FIG. 9 is a block diagram showing a transmitter according to yet another example of the present invention.

FIG. 9 is a block diagram showing a transmitter according to yet another example of the present invention.

Referring to FIG. 9, the transmitter 800 basically has the same elements as the transmitter 600 of FIG. 6, but differs from the transmitter 600 in that a shifting unit 810 is added after the layer mapper 630. The shifting unit 810 performs shifting in the modulated symbol level of each codeword or layer. Alternatively, the shifting unit 810 may perform shifting in the level of at least one modulated symbol groups. DFT spread is then performed by DFT units 640-1 and 640-2.

For example, different MCSs may be applied to a first codeword 1ST cw and a second codeword 2nd cw. In the case where QPSK modulation is applied to one codeword for robust data transmission and a higher modulation order than that of the above QPSK modulation is applied to the other codeword when spatial multiplexing transmission for multiple codewords is performed, a CM characteristic which is on average higher than QPSK because of shifting is obtained. For this reason, a codeword to which QPSK modulation has been applied may have an error rate higher than an expected error rate.

For another example, the same modulation order and different coding rates may be applied to a first codeword and a second codeword. In the case where different coding rates are applied to codewords, if a Serial Interference Cancellation (SIC) receiver is used, a higher gain can be expected. For example, with an increase in the decoding success probability of the first codeword on which decoding is first performed, the decoding success probability of the second codeword is increased. For this reason, a robust coding rate can be selected for the first codeword. Meanwhile, since the detection success probability of the second codeword is increased by interference cancellation, a coding rate lower than a reference coding rate may be selected for the second codeword so that a greater amount of data may be transmitted.

To determine an MCS for each codeword as described above may be performed by the scheduler of a receiver (not shown) or may be randomly determined by the transmitter. It is hereinafter assumed that an MCS for each codeword is determined by the scheduler of the receiver. Here, the scheduler sends scheduling information, necessary for the transmitter to send data, to the transmitter, and the scheduling information includes MCS information. The transmitter can send data by applying the MCS, determined by the scheduler of the receiver, to each codeword. The transmitter sends data by applying the MCS, included in the scheduling information, to each codeword. The scheduler selects an MCS, suitable for the data transmission of each codeword, based on channel information obtained from Channel Quality Information (CQI) or a Sounding Reference Signal (SRS) which are received from the transmitter. As described above, the MCS may be identical or different for every codeword, and only the coding rate is different, but the modulation order may be identical.

In the case where an MCS for each codeword is informed, overhead for control information necessary to inform the MCS information may be increased. In order to reduce such overhead, the scheduler does not directly inform the MCS which will be applied to the second codeword and may inform only a range increased or decreased from the MCS of the first codeword. In this case, overhead for the number of bits necessary to inform the MCS of the second codeword can be reduced according to the increment or decrement range. Here, an MCS (that is, a reference for increment) is called a reference MCS, and the range of increment and decrement is called a differential value. That is, the scheduler informs an MCS for each codeword by using the reference MCS and the differential value. Here, when an MCS in an increment and decrement level is selected based on the reference MCS, an MCS having a different modulation order from the reference MCS may be selected. The scheduler may select an increment and decrement level so that codewords have the same modulation order. An MCS set, having the same modulation order as, but different coding rates from the reference MCS, may be taken into consideration.

A method of informing MCSs having the same modulation order is described below.

In the method of informing a reference MCS and an increment and decrement level therefor, 0 to 15 levels may be informed in the case where 4 bits are used, 0 to 7 levels may be informed in the case where 3 bits are used, 0 to 3 levels may be informed in the case where 2 bits are used, and 0, 1 levels may be informed in the case where 1 bit is used.

TABLE 5

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

Table 5 shows an MCS table in 3GPP LTE. For the MCS table, reference may be made to 3GPP TS 36.213 V8.5.0 (2008-12) "Technical Specification Group Radio Access Network; Evolved Universal Terrestrial Radio Access (E-UTRA); Physical layer procedures (Release 8)".

A table in which the TBS indices are changed in the existing MCS table may be taken into consideration so that an MCS has the same modulation order as, but different coding rates from a reference MCS.

In the case where a modulation order 2 is selected for the reference MCS, the following methods may be taken into consideration. For example, if the increment and decrement level of an MCS is +1 when an index 9 is selected, a modulation 2 and a TBS index 10 may be selected. Furthermore, in the case where an index 7 is selected for the reference MCS and the increment and decrement level of the MCS is +2, an MCS index 9 is selected. In this case, since the MCS is identical, the values of the existing table are used without change.

In the case where the modulation order 2 is selected for the reference MCS, the TBS indices of a modulation order 4 may be changed as in Table 6.

TABLE 6

| MCS Index $I_{MCS}$ | Modulation Order $Q_m$ | TBS Index $I_{TBS}$ |
|---|---|---|
| 9(0) | 2 | 9 |
| 10(1) | 2 | 10 |
| 10(2) | 2 | 11 |
| 11(3) | 2 | 12 |
| 12(4) | 2 | 13 |
| 13(5) | 2 | 14 |
| 14(6) | 2 | 15 |
| 15(7) | 2 | 16 |
| 16(8) | 2 | 17 |
| 17(9) | 2 | 18 |
| 18(10) | 2 | 19 |
| 19(11) | 2 | 20 |
| 20(12) | 2 | 21 |
| 21(13) | 2 | 22 |
| 22(14) | 2 | 23 |
| 23(15) | 2 | 24 |

In the case where the modulation order 4 is selected for the reference MCS, the TBS indices of a modulation order 6 may be changed as in Table 7.

TABLE 7

| MCS Index $I_{MCS}$ | Modulation Order $Q_m$ | TBS Index $I_{TBS}$ |
|---|---|---|
| 16 | 4 | 15 |
| 17 | 4 | 16 |
| 18 | 4 | 17 |
| 19 | 4 | 18 |
| 20 | 4 | 19 |
| 21 | 4 | 20 |
| 22 | 4 | 21 |
| 23 | 4 | 22 |
| 24 | 4 | 23 |
| 25 | 4 | 24 |
| 26 | 4 | 25 |
| 27 | 4 | 26 |
| 28 | 4 | 27 |

For yet another example, the same MCS may be applied to the first codeword and the second codeword. Layers may have an averaged SINR (Signal to Interference and Noise Ratio) through shifting. An MCS suitable for the averaged SINR is applied to each codeword. In this case, overhead according to the transmission of MCSs can be reduced because the scheduler has only to send only a single MCS.

For yet another example, when shifting is performed in the modulated symbol level, the SC-OFDM symbol level, the slot level, or the codeword level, the following method may be taken into consideration such that modulated symbols having the same modulation order can be mapped for every transmission layer.

The encoded bits of each codeword may be modulated by taking modulated symbol level shifting into consideration. For example, in a first modulation symbol time, a first codeword may be QPSK-modulated and then mapped to a first layer, and a second codeword may be 16QAM-modulated and then mapped to a second layer. In a next modulation symbol time, the first codeword may be 16QAM-modulated and then mapped to the second layer, and the second codeword may be QPSK-modulated and then mapped to the first layer.

In the present invention, the shiftings of the modulated symbol, SC-FDMA symbol, slot, and codeword levels may be performed before or after DFT or after or IFFT. Here, codewords should have the same modulation order in order to maintain a low PAPR when a shifted and modulated symbol stream is DFT-spread.

When shifting is performed, layer shifting may be performed using shifting matrices. Some of the shifting matrices may be selected and used.

For example, for two layers, two matrices of a 2×2 shifting matrix listed in Table 8 may be used.

TABLE 8

| (1) 1/2 | (2) 2/1 |
|---|---|
| $P_{21} = \begin{bmatrix} 1 & 0 \\ 0 & 1 \end{bmatrix}$ | $P_{22} = \begin{bmatrix} 0 & 1 \\ 1 & 0 \end{bmatrix}$ |

For example, for three layers, six matrices of a 3×3 shifting matrix listed in Table 9 may be used. Some of the six matrices may be selected. Three of the six matrices may be selected and used according to the number of layers.

TABLE 9

| (1) 1/2/3 | (2) 1/3/2 | (3) 2/1/3 |
|---|---|---|
| $P_{31} = \begin{bmatrix} 1 & 0 & 0 \\ 0 & 1 & 0 \\ 0 & 0 & 1 \end{bmatrix}$ | $P_{32} = \begin{bmatrix} 1 & 0 & 0 \\ 0 & 0 & 1 \\ 0 & 1 & 0 \end{bmatrix}$ | $P_{33} = \begin{bmatrix} 0 & 1 & 0 \\ 1 & 0 & 0 \\ 0 & 0 & 1 \end{bmatrix}$ |
| (4) 2/3/1 | (5) 3/1/2 | (6) 3/2/1 |
| $P_{34} = \begin{bmatrix} 0 & 1 & 0 \\ 0 & 0 & 1 \\ 1 & 0 & 0 \end{bmatrix}$ | $P_{35} = \begin{bmatrix} 0 & 0 & 1 \\ 1 & 0 & 0 \\ 0 & 1 & 0 \end{bmatrix}$ | $P_{36} = \begin{bmatrix} 0 & 0 & 1 \\ 0 & 1 & 0 \\ 1 & 0 & 0 \end{bmatrix}$ |

For example, for four layers, 24 matrices of a 4×4 shifting matrix listed in Table 10 may be used. Some of the 24 matrices may be selected. Four of the 24 matrices may be selected and used according to the number of layers.

TABLE 10

| (1) 1/2/3/4 | (2) 2/1/3/4 | (3) 3/1/2/4 |
|---|---|---|
| $P_{401} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $P_{402} = \begin{bmatrix} 0 & 1 & 0 & 0 \\ 1 & 0 & 0 & 0 \\ 0 & 0 & 1 & 0 \\ 0 & 0 & 0 & 1 \end{bmatrix}$ | $P_{403} = \begin{bmatrix} 0 & 1 & 0 & 0 \\ 0 & 0 & 1 & 0 \\ 1 & 0 & 0 & 0 \\ 0 & 0 & 0 & 1 \end{bmatrix}$ |
| (4) 4/1/2/3 | (5) 1/2/4/3 | (6) 2/1/4/3 |
| $P_{404} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$ | $P_{405} = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$ | $P_{406} = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$ |
| (7) 3/1/4/2 | (8) 4/1/3/2 | (9) 1/3/2/4 |
| $P_{407} = \begin{bmatrix} 0 & 1 & 0 & 0 \\ 0 & 0 & 0 & 1 \\ 1 & 0 & 0 & 0 \\ 0 & 0 & 1 & 0 \end{bmatrix}$ | $P_{408} = \begin{bmatrix} 0 & 1 & 0 & 0 \\ 0 & 0 & 0 & 1 \\ 0 & 0 & 1 & 0 \\ 1 & 0 & 0 & 0 \end{bmatrix}$ | $P_{409} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$ |
| (10) 2/3/1/4 | (11) 3/2/1/4 | (12) 4/2/1/3 |
| $P_{410} = \begin{bmatrix} 0 & 0 & 1 & 0 \\ 1 & 0 & 0 & 0 \\ 0 & 1 & 0 & 0 \\ 0 & 0 & 0 & 1 \end{bmatrix}$ | $P_{411} = \begin{bmatrix} 0 & 0 & 1 & 0 \\ 0 & 1 & 0 & 0 \\ 1 & 0 & 0 & 0 \\ 0 & 0 & 0 & 1 \end{bmatrix}$ | $P_{412} = \begin{bmatrix} 0 & 0 & 1 & 0 \\ 0 & 1 & 0 & 0 \\ 0 & 0 & 0 & 1 \\ 1 & 0 & 0 & 0 \end{bmatrix}$ |
| (13) 1/3/4/2 | (14) 2/3/4/1 | (15) 3/2/4/1 |
| $P_{413} = \begin{bmatrix} 1 & 0 & 0 & 0 \\ 0 & 0 & 0 & 1 \\ 0 & 1 & 0 & 0 \\ 0 & 0 & 1 & 0 \end{bmatrix}$ | $P_{414} = \begin{bmatrix} 0 & 0 & 0 & 1 \\ 1 & 0 & 0 & 0 \\ 0 & 1 & 0 & 0 \\ 0 & 0 & 1 & 0 \end{bmatrix}$ | $P_{415} = \begin{bmatrix} 0 & 0 & 0 & 1 \\ 0 & 1 & 0 & 0 \\ 1 & 0 & 0 & 0 \\ 0 & 0 & 1 & 0 \end{bmatrix}$ |
| (16) 4/2/3/1 | (17) 1/4/2/3 | (18) 2/4/1/3 |
| $P_{416} = \begin{bmatrix} 0 & 0 & 0 & 1 \\ 0 & 1 & 0 & 0 \\ 0 & 0 & 1 & 0 \\ 1 & 0 & 0 & 0 \end{bmatrix}$ | $P_{417} = \begin{bmatrix} 1 & 0 & 0 & 0 \\ 0 & 0 & 1 & 0 \\ 0 & 0 & 0 & 1 \\ 0 & 1 & 0 & 0 \end{bmatrix}$ | $P_{418} = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ |
| (19) 3/4/1/2 | (20) 4/3/1/2 | (21) 1/4/3/2 |

TABLE 10-continued

| $P_{419} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}$ | $P_{420} = \begin{bmatrix} 0 & 0 & 1 & 0 \\ 0 & 0 & 0 & 1 \\ 0 & 1 & 0 & 0 \\ 1 & 0 & 0 & 0 \end{bmatrix}$ | $P_{421} = \begin{bmatrix} 1 & 0 & 0 & 0 \\ 0 & 0 & 0 & 1 \\ 0 & 0 & 1 & 0 \\ 0 & 1 & 0 & 0 \end{bmatrix}$ |
|---|---|---|
| (22) 2/4/3/1 | (23) 3/4/2/1 | (24) 4/3/2/1 |
| $P_{422} = \begin{bmatrix} 0 & 0 & 0 & 1 \\ 1 & 0 & 0 & 0 \\ 0 & 0 & 1 & 0 \\ 0 & 1 & 0 & 0 \end{bmatrix}$ | $P_{423} = \begin{bmatrix} 0 & 0 & 0 & 1 \\ 0 & 0 & 1 & 0 \\ 1 & 0 & 0 & 0 \\ 0 & 1 & 0 & 0 \end{bmatrix}$ | $P_{424} = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$ |

Shifting may be performed in units of modulated symbols. In this case, a shifting matrix may be selected in units of modulated symbols.

[Equation 7]
$$P(i) \begin{bmatrix} s^{(0)}(i) \\ \vdots \\ s^{(\upsilon-1)}(i) \end{bmatrix}, \text{ where, } i = 0, 1, \ldots, M_{symb}^{layer}$$

$$P(i) = C_k$$

$$k = (i \bmod \upsilon) + 1$$

$$k \in \{1, \ldots, \upsilon\}$$

$C_1, \ldots, C_\upsilon$: Permutation matrices $\upsilon$: denotes the rank (the number of transmission layers)

$i$: index of modulated symbol

For example, for the transmission of four layers, if the matrices $P_{401}$, $P_{404}$, $P_{419}$, and $P_{414}$ in Table 10 are used and Equation 7 is applied, the mapping of modulated symbols according to layer shifting may be represented as in Table 11.

TABLE 11

| Modulated symbol index (i) | Index(v) of layer to which each modulated symbol is mapped | | | | | | | | | | |
|---|---|---|---|---|---|---|---|---|---|---|---|
| 1 | 1 | 2 | 3 | 4 | 1 | 2 | 3 | 4 | 1 | 2 | 3 | 4 |
| 2 | 2 | 3 | 4 | 1 | 2 | 3 | 4 | 1 | 2 | 3 | 4 | 1 |
| 3 | 3 | 4 | 1 | 2 | 3 | 4 | 1 | 2 | 3 | 4 | 1 | 2 |
| 4 | 4 | 1 | 2 | 3 | 4 | 1 | 2 | 3 | 4 | 1 | 2 | 3 |

In Table 11, the rows indicate respective layers 1 to 4. Table 11 shows that modulated symbols are circulated and mapped according to time by the respective codewords 1 to 4 and then mapped to the respective layers 1 to 4.

Here, the modulated symbols are mapped and arranged for every layer so that the modulated symbols of each codeword are included.

In an SC-FDMA system, data symbols are spread over frequency bands allocated by DFT spread and then transmitted. Accordingly, the index of a modulated symbol does not mean the index of a subcarrier. That is, data symbols are not mapped to specific subcarriers according to their indices, but the data symbols are evenly spread over allocated frequency bands although they have what indices and then subjected to an average channel characteristic of the allocated frequency bands. Accordingly, in an SC-FDMA system, the number of modulated symbols of a codeword mapped to a layer, rather than a position to which a modulation symbol is mapped according to the index of the modulated symbol, may become an important factor in layer shifting.

If modulated symbols of each codeword are arranged for every layer so that the modulated symbols are included, the modulated symbols of the codeword experience each layer in a similar frequency. Accordingly, all the codewords can be sent according to an MCS suitable for an average channel state of the layers. Table 9 to Table 20 show examples in which the same number of modulated symbols are mapped for every layer.

Here, the consecutive modulated symbol streams of a specific codeword may be 'DFT spread length/the number (N) of layers' or 'DFT spread length' or 'a plurality of DFT spread lengths'. Table 12 shows an example in which the modulated symbols of a codeword are consecutively mapped to the same position for every layer.

TABLE 12

| Modulated symbol index (i) | Index(v) of layer to which each modulated symbol is mapped | | | | | | | | | |
|---|---|---|---|---|---|---|---|---|---|---|
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |

Table 13 shows an example in which the modulated symbols of a codeword are consecutively mapped to different positions for every layer.

TABLE 13

| Modulated symbol index (i) | Index(v) of layer to which each modulated symbol is mapped | | | | | | | | | |
|---|---|---|---|---|---|---|---|---|---|---|
| 1 | 1 | 1 | 1 | 1 | 1 | 2 | 2 | 2 | 2 | 2 | 2 |
| 2 | 2 | 2 | 2 | 2 | 2 | 1 | 1 | 1 | 1 | 1 | 1 |

For example, assuming that in transmission having a DFT spread length of 6, six modulated symbols corresponding to a first codeword are mapped to a first layer and six modulated symbols corresponding to a second codeword is then mapped to the first layer, in a second layer, the modulated symbols of the second codeword corresponding to the six modulated symbol length may have the same length as a plurality of DFT spread lengths.

Table 14 shows an example in which the modulated symbols of a codeword are mapped between the same positions for every layer.

TABLE 14

| Modulated symbol index (i) | Index(v) of layer to which each modulated symbol is mapped | | | | | | | | | |
|---|---|---|---|---|---|---|---|---|---|---|
| 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 |

Table 15 shows an example in which the modulated symbols of a codeword are mapped between different positions for every layer.

TABLE 15

| Modulated symbol index (i) | Index(v) of layer to which each modulated symbol is mapped | | | | | | | | | |
|---|---|---|---|---|---|---|---|---|---|---|
| 1 | 2 | 1 | 2 | 1 | 2 | 1 | 2 | 1 | 2 | 1 | 2 |
| 2 | 1 | 2 | 1 | 2 | 1 | 2 | 1 | 2 | 1 | 2 | 1 |

Tables 16 to 19 and Tables 20 to 23 show examples of 3-layer transmission and 4-layer transmission.

TABLE 16

| Modulated symbol index (i) | Index(v) of layer to which each modulated symbol is mapped | | | | | | | | | |
|---|---|---|---|---|---|---|---|---|---|---|
| 1 | 1 | 1 | 1 | 2 | 2 | 2 | 2 | 3 | 3 | 3 | 3 |
| 1 | 1 | 1 | 1 | 2 | 2 | 2 | 2 | 3 | 3 | 3 | 3 |
| 1 | 1 | 1 | 1 | 2 | 2 | 2 | 2 | 3 | 3 | 3 | 3 |

TABLE 17

| Modulated symbol index (i) | Index(v) of layer to which each modulated symbol is mapped | | | | | | | | | |
|---|---|---|---|---|---|---|---|---|---|---|
| 1 | 1 | 1 | 1 | 2 | 2 | 2 | 2 | 3 | 3 | 3 | 3 |
| 2 | 2 | 2 | 2 | 3 | 3 | 3 | 3 | 1 | 1 | 1 | 1 |
| 3 | 3 | 3 | 3 | 1 | 1 | 1 | 1 | 2 | 2 | 2 | 2 |

TABLE 18

| Modulated symbol index (i) | Index(v) of layer to which each modulated symbol is mapped | | | | | | | | | |
|---|---|---|---|---|---|---|---|---|---|---|
| 1 | 2 | 3 | 1 | 2 | 3 | 1 | 2 | 3 | 1 | 2 | 3 |
| 1 | 2 | 3 | 1 | 2 | 3 | 1 | 2 | 3 | 1 | 2 | 3 |
| 1 | 2 | 3 | 1 | 2 | 3 | 1 | 2 | 3 | 1 | 2 | 3 |

TABLE 19

| Modulated symbol index (i) | Index(v) of layer to which each modulated symbol is mapped | | | | | | | | | |
|---|---|---|---|---|---|---|---|---|---|---|
| 1 | 2 | 3 | 1 | 2 | 3 | 1 | 2 | 3 | 1 | 2 | 3 |
| 2 | 3 | 1 | 2 | 3 | 1 | 2 | 3 | 1 | 2 | 3 | 1 |
| 3 | 1 | 2 | 3 | 1 | 2 | 3 | 1 | 2 | 3 | 1 | 2 |

TABLE 20

| Modulated symbol index (i) | Index(v) of layer to which each modulated symbol is mapped | | | | | | | | | |
|---|---|---|---|---|---|---|---|---|---|---|
| 1 | 1 | 1 | 2 | 2 | 2 | 3 | 3 | 3 | 4 | 4 | 4 |
| 1 | 1 | 1 | 2 | 2 | 2 | 3 | 3 | 3 | 4 | 4 | 4 |
| 1 | 1 | 1 | 2 | 2 | 2 | 3 | 3 | 3 | 4 | 4 | 4 |
| 1 | 1 | 1 | 2 | 2 | 2 | 3 | 3 | 3 | 4 | 4 | 4 |

TABLE 21

| Modulated symbol index (i) | Index(v) of layer to which each modulated symbol is mapped | | | | | | | | | |
|---|---|---|---|---|---|---|---|---|---|---|
| 1 | 1 | 1 | 2 | 2 | 2 | 3 | 3 | 3 | 4 | 4 | 4 |
| 2 | 2 | 2 | 3 | 3 | 3 | 4 | 4 | 4 | 1 | 1 | 1 |
| 3 | 3 | 3 | 4 | 4 | 4 | 1 | 3 | 3 | 2 | 2 | 2 |

TABLE 22

| Modulated symbol index (i) | Index(v) of layer to which each modulated symbol is mapped | | | | | | | | | | |
|---|---|---|---|---|---|---|---|---|---|---|---|
| 1 | 2 | 3 | 4 | 1 | 2 | 3 | 4 | 1 | 2 | 3 | 4 |
| 1 | 2 | 3 | 4 | 1 | 2 | 3 | 4 | 1 | 2 | 3 | 4 |
| 1 | 2 | 3 | 4 | 1 | 2 | 3 | 4 | 1 | 2 | 3 | 4 |
| 1 | 2 | 3 | 4 | 1 | 2 | 3 | 4 | 1 | 2 | 3 | 4 |

TABLE 23

| Modulated symbol index (i) | Index(v) of layer to which each modulated symbol is mapped | | | | | | | | | | |
|---|---|---|---|---|---|---|---|---|---|---|---|
| 1 | 2 | 3 | 4 | 1 | 2 | 3 | 4 | 1 | 2 | 3 | 4 |
| 2 | 3 | 4 | 1 | 2 | 3 | 4 | 1 | 2 | 3 | 4 | 1 |
| 3 | 4 | 1 | 2 | 3 | 4 | 1 | 2 | 3 | 4 | 1 | 2 |
| 4 | 1 | 2 | 3 | 4 | 1 | 2 | 3 | 4 | 1 | 2 | 3 |

The above shifting schemes may be performed using various methods in addition to the above methods. After shifting is applied, in next shifting, 1) a certain position may be designated and 2) the position may be subjected to cyclic shift for every antenna or every layer. The above-described shifting schemes may be applied to not only MIMO systems using channel-independent precoding, but also MIMO systems using channel-dependant precoding.

All the above-described functions may be executed by software, coded to execute the above functions, or a processor, such as a micoprocessor, a controller, a microcontroller, a processor such as ASICs (Application Specific Integrated Circuits). The design, development, and implementations of the codes may be evident to a person having ordinary skilled in the art on the basis of the description of the present invention.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting multiple codewords in a wireless communication system using a plurality of transmission antennas, the method comprising:
generating a plurality of parallel codewords by encoding a plurality of parallel information bit streams;
generating a plurality of parallel modulated symbol streams by modulating the plurality of parallel codewords;
generating a plurality of frequency domain symbol streams by performing Discrete Fourier Transform (DFT) on the modulated symbol streams;
precoding the plurality of frequency domain symbol streams;
mapping the precoded frequency domain symbol streams onto resource elements;
generating Single Carrier Frequency Division Multiple Access (SC-FDMA) symbols by performing Inverse Fast Fourier Transform (IFFT) on the plurality of frequency domain symbol streams;
performing shifting that changes layers to which the plurality of parallel codewords, the plurality of parallel modulated symbol streams, or the plurality of frequency domain symbol streams is mapped at a predetermined time interval; and
transmitting the SC-FDMA symbols.

2. The method of claim 1, wherein:
the shifting is performed after generating the plurality of frequency domain symbol streams by performing the DFT, and
the time interval is a plurality of the SC-FDMA symbols.

3. The method of claim 1, wherein the time interval is a single SC-FDMA symbol.

4. The method of claim 1, further comprising mapping the layers to the plurality of transmission antennas.

5. The method of claim 4, wherein the number of the layers is smaller than or equal to the number of transmission antennas.

6. The method of claim 4, wherein the layers are mapped onto one or more of the transmission antennas.

7. The method of claim 1, wherein different Modulation and Coding Schemes (MCSs) are applied to the plurality of parallel codewords and the plurality of parallel modulated symbol streams.

8. The method of claim 1, wherein:
different coding rates are applied to the plurality of parallel codewords, and
an identical modulation order is applied to the plurality of parallel modulated symbol streams.

9. The method of claim 1, wherein the shifting is performed only when the SC-FDMA symbols are retransmitted.

10. The method of claim 1, wherein:
the shifting is performed after generating the SC-FDMA symbols, and
the time interval is a single SC-FDMA symbol.

11. An apparatus for transmitting multiple codewords in a wireless communication system using a plurality of transmission antennas, the apparatus comprising:
encoders for generating a plurality of parallel codewords by encoding a plurality of parallel information bit streams;
mappers for generating a plurality of parallel modulated symbol streams by modulating the plurality of parallel codewords;
DFT units for generating a plurality of frequency domain symbol streams by performing Discrete Fourier Transform (DFT) on the modulated symbol streams;
a precoder for precoding the plurality of frequency domain symbol streams;
resource element mappers for mapping the precoded frequency domain symbol streams onto resource elements;
signal generators for generating Single Carrier Frequency Division Multiple Access (SC-FDMA) symbols by performing Fast Fourier Transform (IFFT) on the plurality of frequency domain symbol streams;
a shifting unit for performing shifting that changes layers to which the plurality of parallel codewords, the plurality of parallel modulated symbol streams, or the plurality of frequency domain symbol streams is mapped at a predetermined time interval; and
the plurality of transmission antennas for sending the SC-FDMA symbols.

* * * * *